(12) United States Patent
Ray et al.

(10) Patent No.: US 8,311,143 B2
(45) Date of Patent: Nov. 13, 2012

(54) SCALING METHODS AND APPARATUS USING SNR ESTIMATE TO AVOID OVERFLOW

(75) Inventors: Siddharth Ray, San Diego, CA (US); Sundeep Rangan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 856 days.

(21) Appl. No.: 12/404,956

(22) Filed: Mar. 16, 2009

(65) Prior Publication Data

US 2009/0245442 A1 Oct. 1, 2009

Related U.S. Application Data

(60) Provisional application No. 61/041,240, filed on Mar. 31, 2008.

(51) Int. Cl.
*H04B 7/02* (2006.01)

(52) U.S. Cl. ......... 375/267; 375/259; 375/260; 455/132

(58) Field of Classification Search .................. 375/267
See application file for complete search history.

(56) References Cited

U.S. PATENT DOCUMENTS

| | | | |
|---|---|---|---|
| 7,486,716 B2* | 2/2009 | Fulghum et al. | 375/150 |
| 7,561,637 B2* | 7/2009 | Jonsson et al. | 375/316 |
| 7,583,744 B2 | 9/2009 | Sindhushayana | |
| 7,995,641 B2* | 8/2011 | Bottomley et al. | 375/150 |
| 2001/0055408 A1* | 12/2001 | Reefman et al. | 382/100 |
| 2004/0142665 A1 | 7/2004 | Papathanasion et al. | |
| 2005/0101279 A1* | 5/2005 | Lee et al. | 455/278.1 |
| 2005/0152317 A1* | 7/2005 | Awater et al. | 370/338 |
| 2005/0286388 A1* | 12/2005 | Ayres et al. | 369/103 |
| 2006/0291543 A1* | 12/2006 | Fulghum et al. | 375/150 |
| 2007/0116095 A1* | 5/2007 | Gerlach | 375/130 |
| 2008/0267318 A1* | 10/2008 | Ihm et al. | 375/299 |
| 2009/0116455 A1* | 5/2009 | Bottomley et al. | 370/335 |
| 2009/0201206 A1* | 8/2009 | Li et al. | 342/373 |
| 2011/0044376 A1* | 2/2011 | Lin et al. | 375/130 |
| 2011/0311105 A1* | 12/2011 | Schwotzer et al. | 382/106 |

FOREIGN PATENT DOCUMENTS

| | | |
|---|---|---|
| EP | 1545082 A2 | 6/2005 |
| GB | 2434948 | 8/2007 |
| WO | WO 9965161 A1 | 12/1999 |

OTHER PUBLICATIONS

International Search Report & Written Opinion—PCT/US2009/037456, International Search Authority—European Patent Office—Mar. 3, 2010.

* cited by examiner

*Primary Examiner* — David Ometz
*Assistant Examiner* — Santiago Garcia
(74) *Attorney, Agent, or Firm* — Stanton Braden

(57) ABSTRACT

Methods and apparatus for avoiding overflow and underflow conditions through the determination of appropriate scaling factors in signal estimation processing in a receiver are described. The receiver estimates transmitted symbols from one or more transmitter device antennas, while avoiding underflow and overflow conditions. A pilot based noise estimate and an estimated expected received signal power, corresponding to a transmit antenna, are used to generate an SNR corresponding to the transmit antenna. The generated SNR is used to determine, e.g., select from a fixed size set of predetermined scale factor values, a scale factor to be used for estimation processing associated with the transmit antenna. In some embodiments, the generated scaling factors are used by a fixed point processing linear least squares error estimation module. Scaling factor determination is performed at a rate which is slower than the rate at which symbols are received from a transmit antenna.

17 Claims, 19 Drawing Sheets

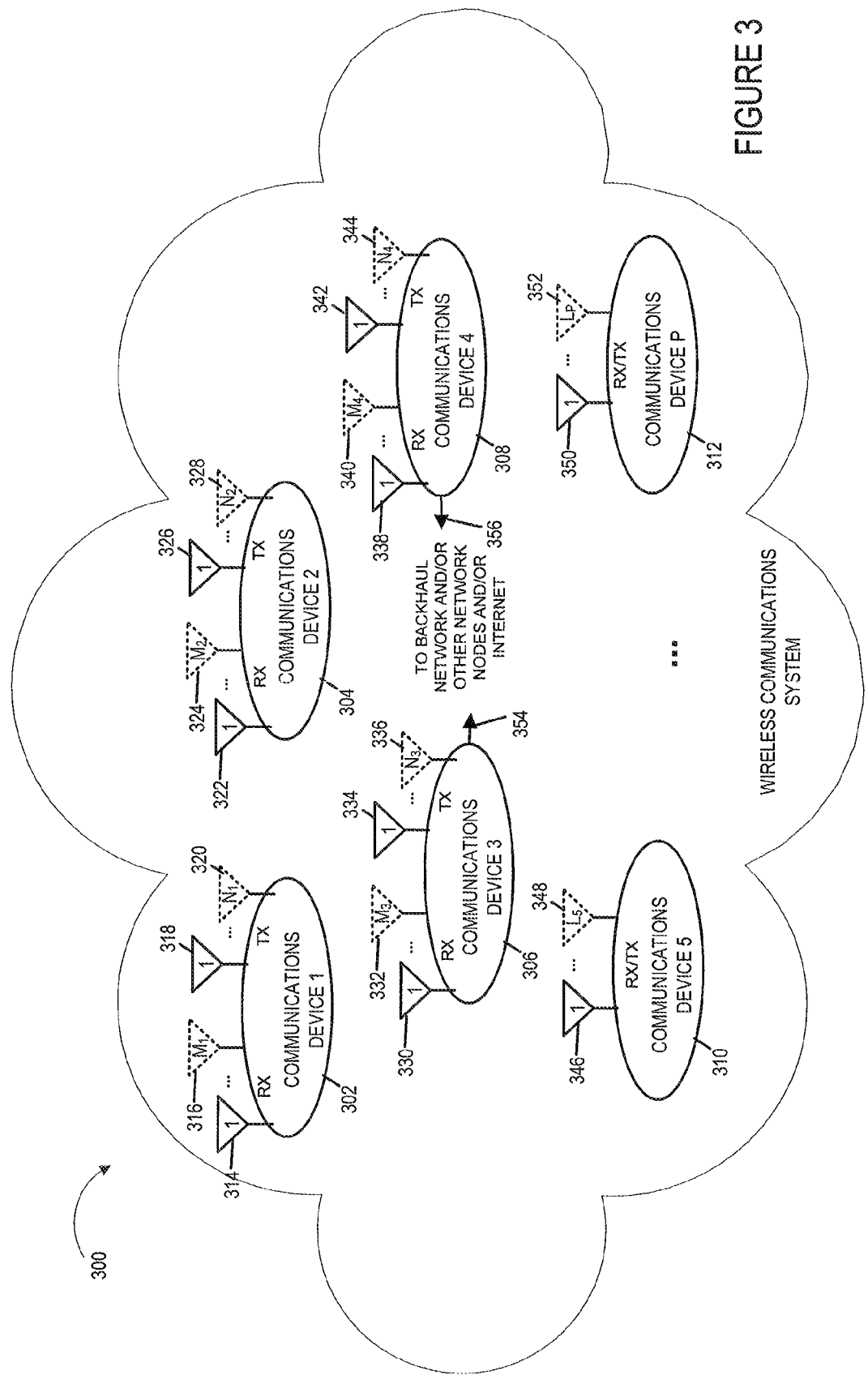

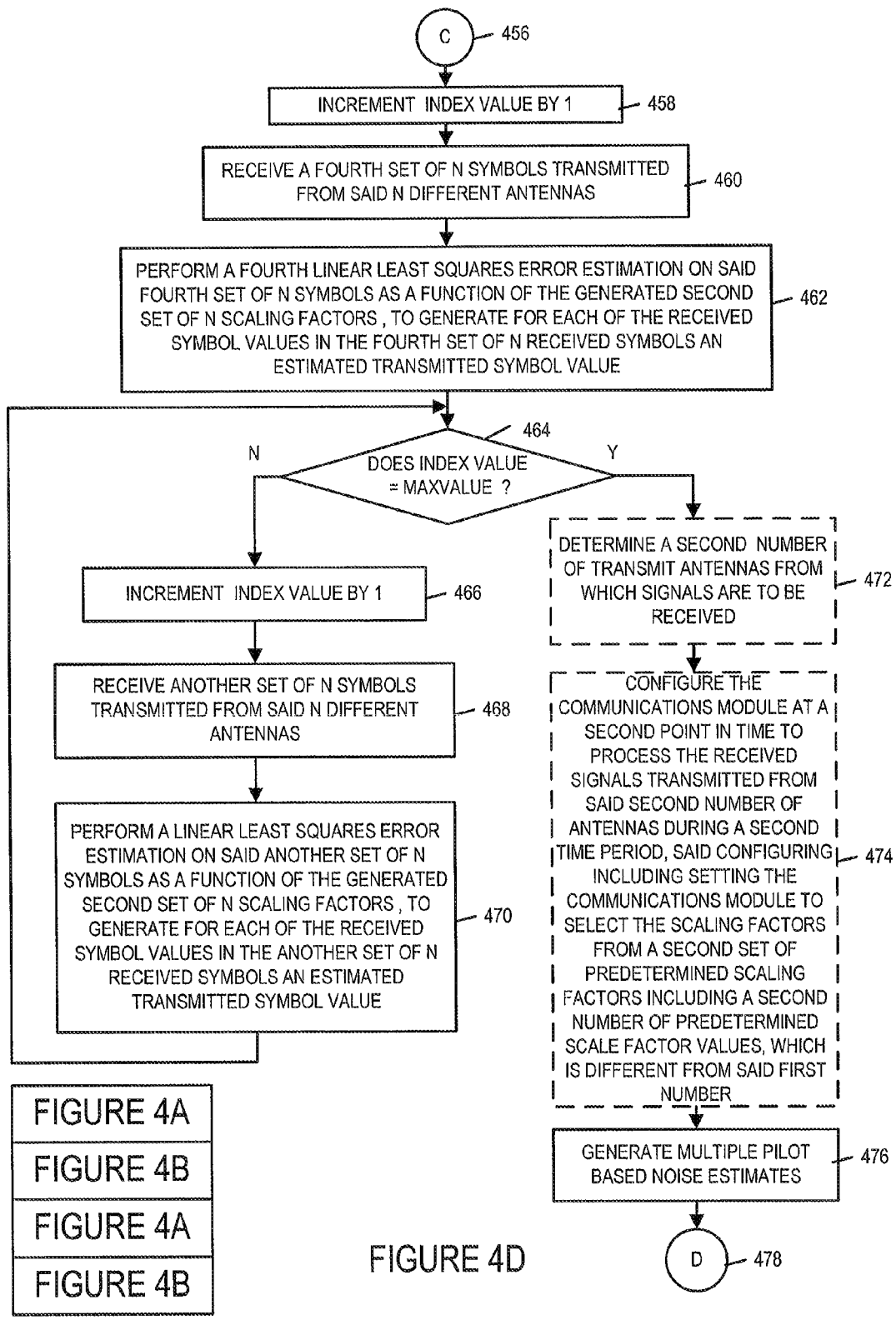

SCALING METHODS AND APPARATUS USING SNR ESTIMATE TO AVOID OVERFLOW

RELATED APPLICATIONS

The present application claims the benefit of U.S. Provisional Patent Application Ser. No. 61/041,240, filed Mar. 31, 2008 titled "SCALING METHODS AND DEVICES USING SNR ESTIMATE TO AVOID OVERFLOW", which is assigned to the assignee of the present application and which is hereby expressly incorporated by reference.

FIELD

Various embodiments relate to wireless communications, and more particularly, to methods and apparatus which can be used in the generation of estimates of transmitted symbols.

BACKGROUND

In a wireless communication system, a receiver needs to generate an estimate corresponding to a signal received from a transmitter prior to decoding. Along with the signal estimate, additional parameters that affect the decoding based on the estimate also need to be computed. Typically, these parameters are used to soft/hard decode the estimates and are sometimes referred to as slicing parameters.

Various aspects of the signal processing are generally done in the physical layer of the receiver using fixed point arithmetic. In fixed point arithmetic, each of the quantities are represented using a finite number of bits. When a quantity becomes so large/small that it cannot be reliably represented using the allocated number of bits an overflow/underflow occurs, respectively. Each of the finite arithmetic signal processing implementations should ensure that overflows and underflows never, or very rarely, occur.

When a receiver desires to generate estimates corresponding to signals received from multiple transmitters concurrently, the received power levels corresponding to signals received from different transmitters may, at times, be substantially different. In addition, as the number of transmit antennas from which signals are being received increases the number of multiplications and number of divisions increases in the processing which increases the likelihood of an overflow or underflow condition.

Based on the above, there is a need for methods and apparatus to avoid overflow or underflow from occurring while generating estimates corresponding to received signals from one or more transmitters. It would be beneficial if at least some of these methods and apparatus were flexible and/or facilitated efficient symbol estimation while reducing or eliminating processing overflows or underflows when there are different received power levels and/or when different numbers of transmit antennas are used.

SUMMARY

Methods and apparatus for avoiding overflow and underflow conditions in signal estimation processing in a receiver device through the determination of one or more appropriate scale factors are described. The receiver device may estimate transmitted symbols from one or more transmitter device antennas, while avoiding underflow and overflow conditions.

In various embodiments, a pilot based noise estimate and an estimated expected received signal power, corresponding to a transmit antenna, are used to generate an SNR corresponding to the transmit antenna. The generated SNR is used to determine a scale factor to be used for estimation processing associated with the transmit antenna. In some, but not necessarily all, embodiments determining a scaling factor includes selecting a scaling factor from a fixed size set of predetermined scale factor values. In some embodiments, where the receiver is to receive and estimate transmitted symbols corresponding to a plurality of different symbol streams from a plurality of different transmit antennas, the receiver device estimates one SNR per transmit antenna and also generates an individual scaling factor to be used for estimation processing related to the corresponding individual transmit antenna. Thus the receiver may generate a set of scaling factors, one per transmit antenna.

In various embodiments, the generated scaling factor or factors are used by a linear least squares error estimation module using fixed point operations, to generate estimates of transmitted symbols and/or slicing parameters used in decoding operations. The rate at which scaling factors are determined, e.g., selected, is slower in some embodiments than the rate at which symbols are being processed. In at least some embodiments, a set of generated scaling factors is used for an extended time period during which data from multiple transmission blocks are received and processed. This provides for an efficient implementation in terms of the number of processing operations performed as compared to embodiments where the scaling factors are generated at the same rate as symbols are being processed.

An exemplary method for operating a communications module to generate an estimate of one or more transmitted symbols, in accordance with some embodiments, comprises: generating a first set of n scaling factors, one per transmit antenna, each of the n scaling factors being based on a noise estimate and an expected received signal power level corresponding to the one of the n transmit antennas to which the scaling factor corresponds, where n is a positive integer. The exemplary method further comprises: receiving a first set of n symbols transmitted from said n different antennas; and performing a first linear least squares error estimation on said first set of n symbols, as a function of the generated first set of n scaling factors, to generate for each of the received symbols in the first set of n received symbols an estimated transmitted symbol value. An exemplary communications device, in accordance with some embodiments, comprises: a communications module including at least one processor configured to: generate a first set of n scaling factors, one per transmit antenna, each of the n scaling factors being based on a noise estimate and an expected received signal power level corresponding to the one of the n transmit antennas to which the scaling factor corresponds; receive a first set of n symbols transmitted from said n different antennas; and perform a first linear least squares error estimation on said first set of n symbols, as a function of the generated first set of n scaling factors, to generate for each of the received symbols in the first set of n received symbols an estimated transmitted symbol value. The exemplary communications device further includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 3 is a drawing of an exemplary communications system in accordance with an exemplary embodiment.

FIG. 4D is a fourth part of a flowchart of an exemplary method of operating a communications module for use in a communications device to generate an estimate of one or more transmitted symbols in accordance with various exemplary embodiments.

DETAILED DESCRIPTION

Figure 1:
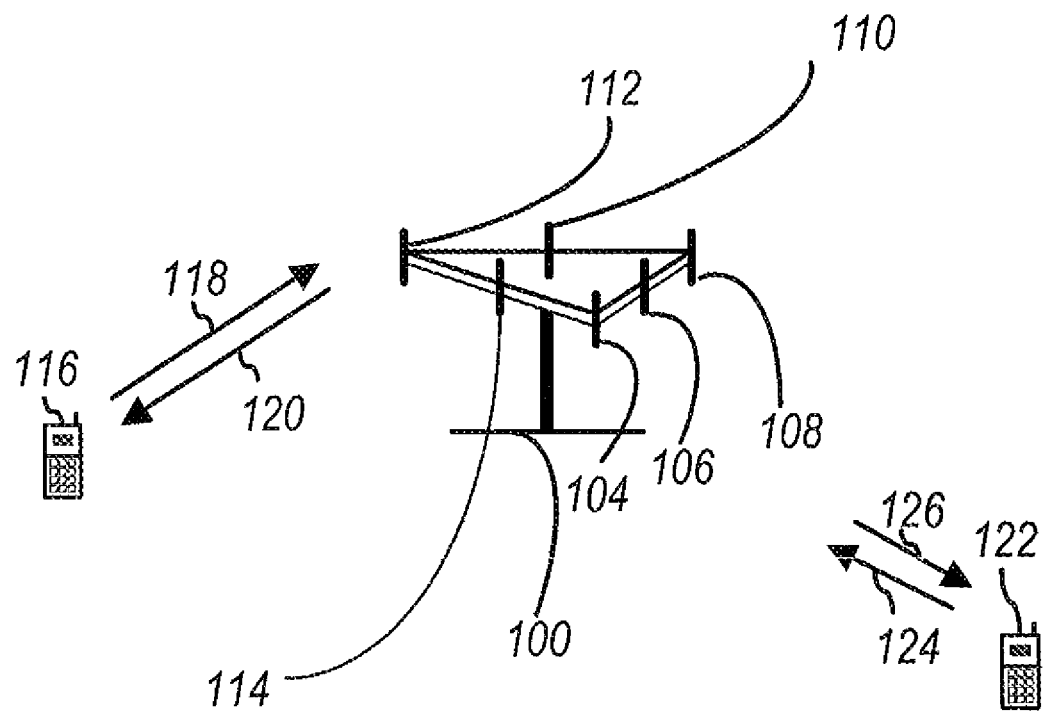
FIG. 1 illustrates a multiple access wireless communication system according to one embodiment.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access node, a node B, a base station, a wireless communications device, or some other terminology. An access terminal may also be called a wireless terminal, user equipment (UE), a wireless communication device, terminal, access terminal, mobile node, mobile terminal, or some other terminology.

Figure 2:
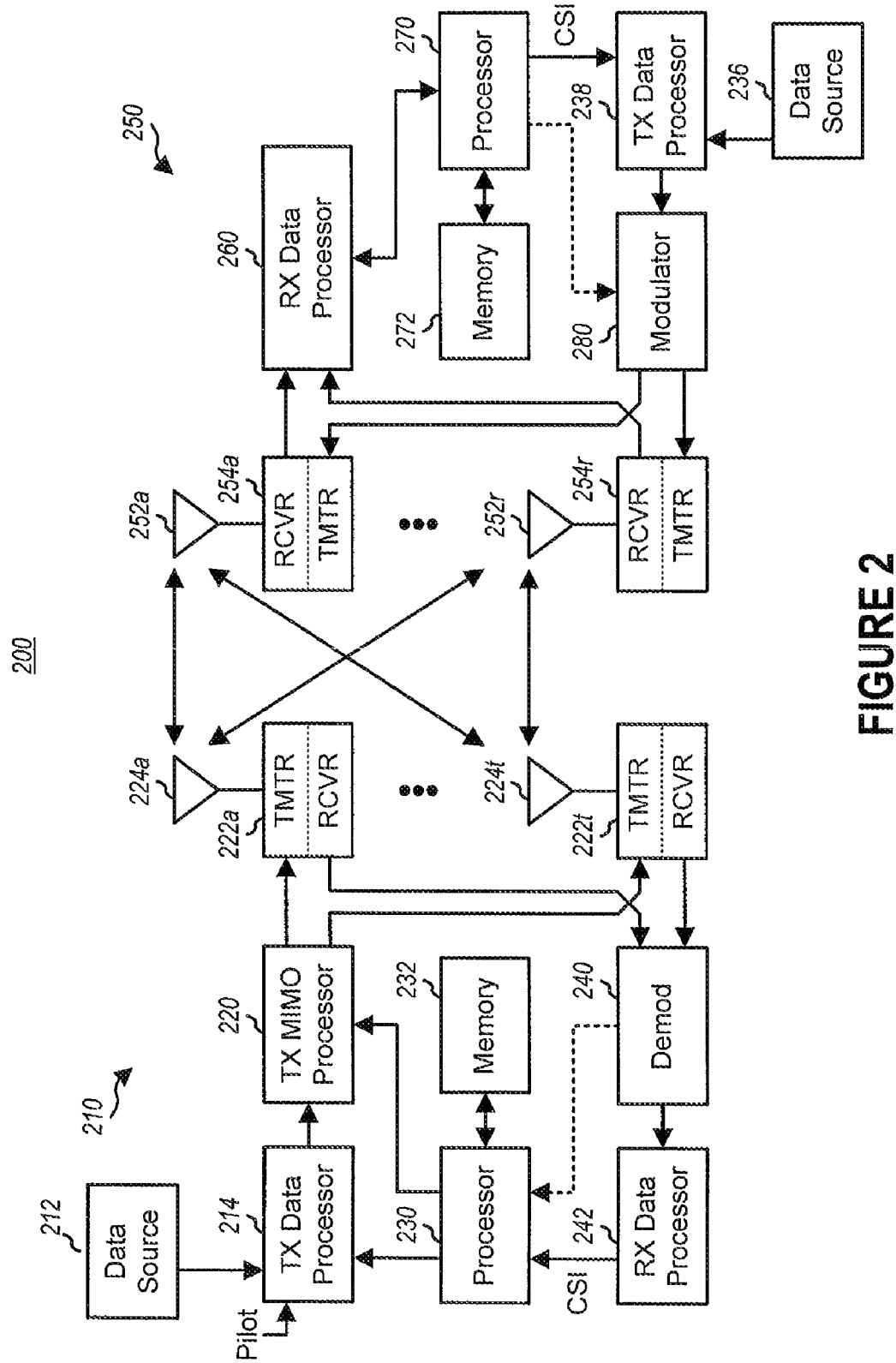
FIG. 2 is a block diagram of a communication system.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In a communication system, the receiver needs to generate an estimate corresponding to a signal received from a transmitter prior to decoding. Along with the signal estimate, additional parameters that affect the decoding based on the estimate also need to be computed. Typically, these parameters are used to soft/hard decode the estimates and are sometimes referred to as slicing parameters. Implemented methods for estimation of the received signal prior to decoding and computation of slicing parameters are a couple among the many signal processing implemented methods generally done in the physical layer of the receiver using fixed point arithmetic. In fixed point arithmetic, each of the quantities are represented using a finite number of bits. When a quantity becomes so large/small that it cannot be reliably represented using the allocated number of bits an overflow/underflow occurs, respectively. Each of the finite arithmetic signal processing methods should ensure that overflows or underflows never, or very rarely, occur. In one aspect of some embodiments, estimates of the received signal power(s) and a noise estimate, e.g., a variance of the noise plus interference, are used to avoid overflow or underflow while estimating the received signal(s).

In some embodiments, the use of a scale, e.g., scaling factor, that depends on the estimates of the received signal power(s) and a noise estimate, e.g., variance of the noise plus interference, is beneficial in avoiding overflow or underflow while estimating the received signal(s) in a communication system.

FIG. 3 is a drawing of an exemplary wireless communications system 300 in accordance with an exemplary embodiment. Exemplary wireless communications system 300 includes a plurality of communications devices (communications device 1 302, communications device 2 304, communications device 3 306, communications device 4 308, communications device 5 310, . . . , communications device P 312). Some of the communications devices are mobile wireless communications devices, e.g., mobile access terminals, which may move through the system 300, while other communications devices are stationary communications devices, e.g., access points such as base stations. Exemplary wireless communications device 1 302 includes 1 or more receive antennas (receive antenna 1 314, . . . , receive antenna $M_1$ 316) and one or more transmit antennas (transmit antenna 1 318, . . . , transmit antenna $N_1$ 320). Exemplary wireless communications device 2 304 includes 1 or more receive antennas (receive antenna 1 322, . . . , receive antenna $M_2$ 324) and one or more transmit antennas (transmit antenna 1 326, . . . , transmit antenna $N_2$ 328). Exemplary wireless communications device 3 306 includes 1 or more receive antennas (receive antenna 1 330, . . . , receive antenna $M_3$ 332) and one or more transmit antennas (transmit antenna 1 334, . . . , transmit antenna $N_3$ 336). Exemplary wireless communications device 4 308 includes 1 or more receive antennas (receive antenna 1 338, . . . , receive antenna $M_4$ 340) and one or more transmit antennas (transmit antenna 1 342, . . . , transmit antenna $N_4$ 344). Exemplary wireless communications device 5 310 includes 1 or more receive/transmit antennas (receive/transmit antenna 1 346, . . . , receive/transmit antenna $L_5$ 348). Exemplary wireless communications device P 312 includes 1 or more receive/transmit antennas (receive/transmit antenna 1 350, . . . , receive/transmit antenna $L_P$ 352). Some of the wireless communications devices in system 300 include an interface to a backhaul network and/or other network nodes and/or the Internet. In this example, communications device 3 306 and communications device 4 308 include such an interface as indicated by arrows (354, 356), respectively. Different communications devices in the system 300 may have different number of antennas. Some of the communications devices in the system may have a different number of receive and transmit antennas. Different symbol streams may be transmitted by different transmit antennas and/or from different RX/TX antennas being used in the TX mode. At least some of the communications devices in system 300 may, and sometimes do, generate estimates of transmitted symbols from one or more other communications devices in the system, e.g., in accordance with a method of flowchart 400 of FIG. 4.

Figure 4A:
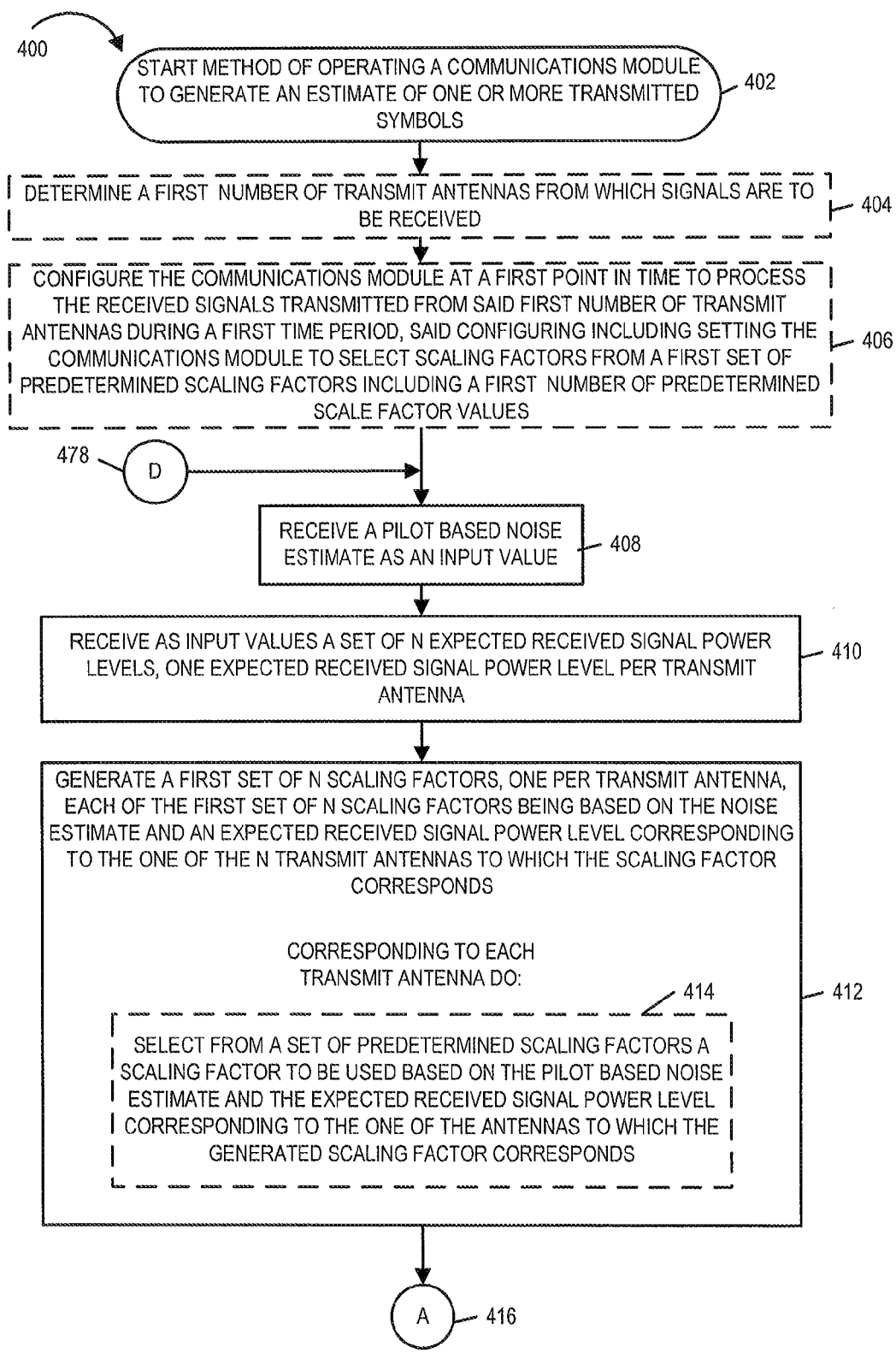
FIG. 4A is a first part of a flowchart of an exemplary method of operating a communications module for use in a communications device to generate an estimate of one or more transmitted symbols in accordance with various exemplary embodiments.
Figure 4B:
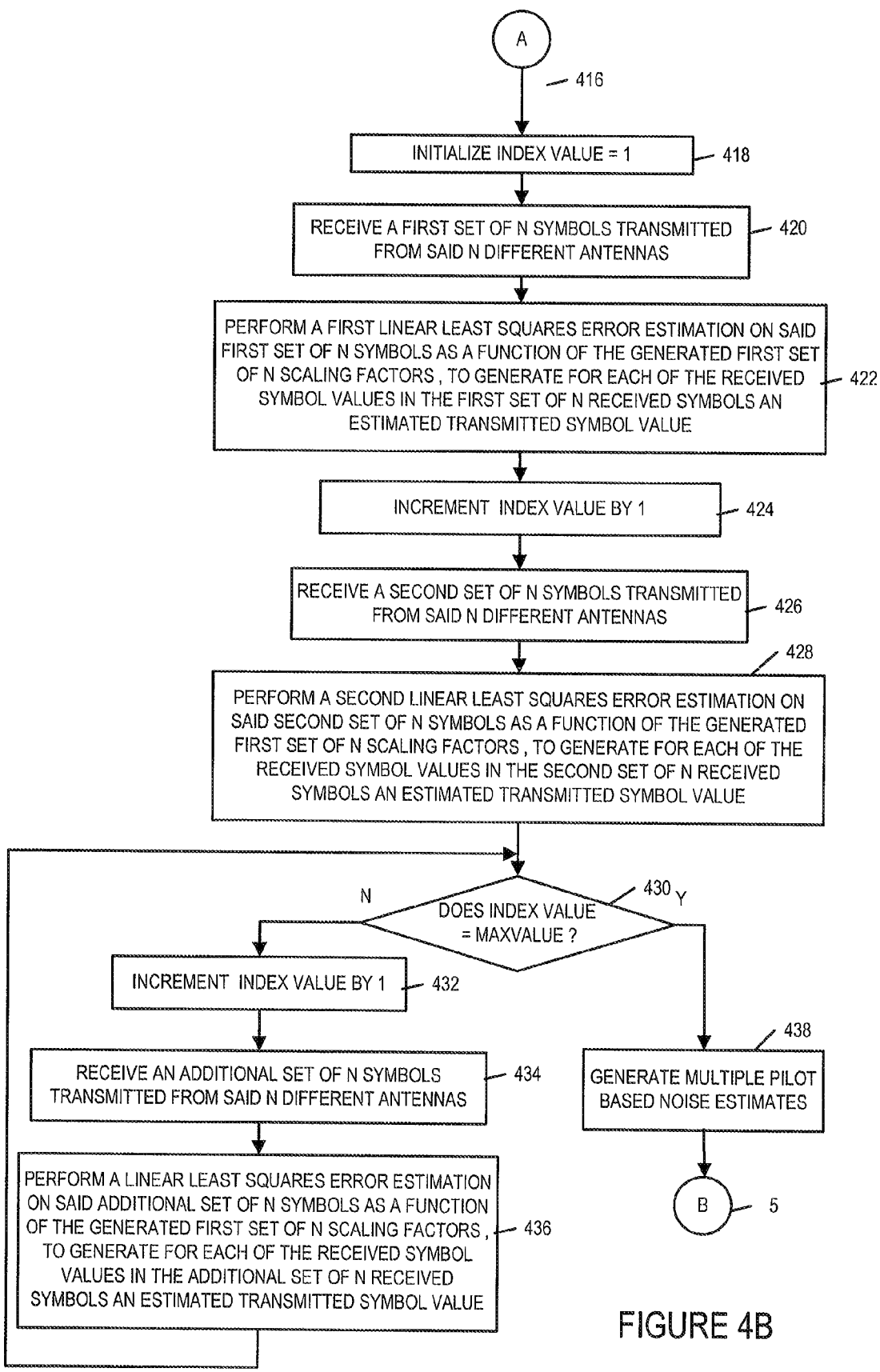
FIG. 4B is a second part of a flowchart of an exemplary method of operating a communications module for use in a communications device to generate an estimate of one or more transmitted symbols in accordance with various exemplary embodiments.
Figure 4C:
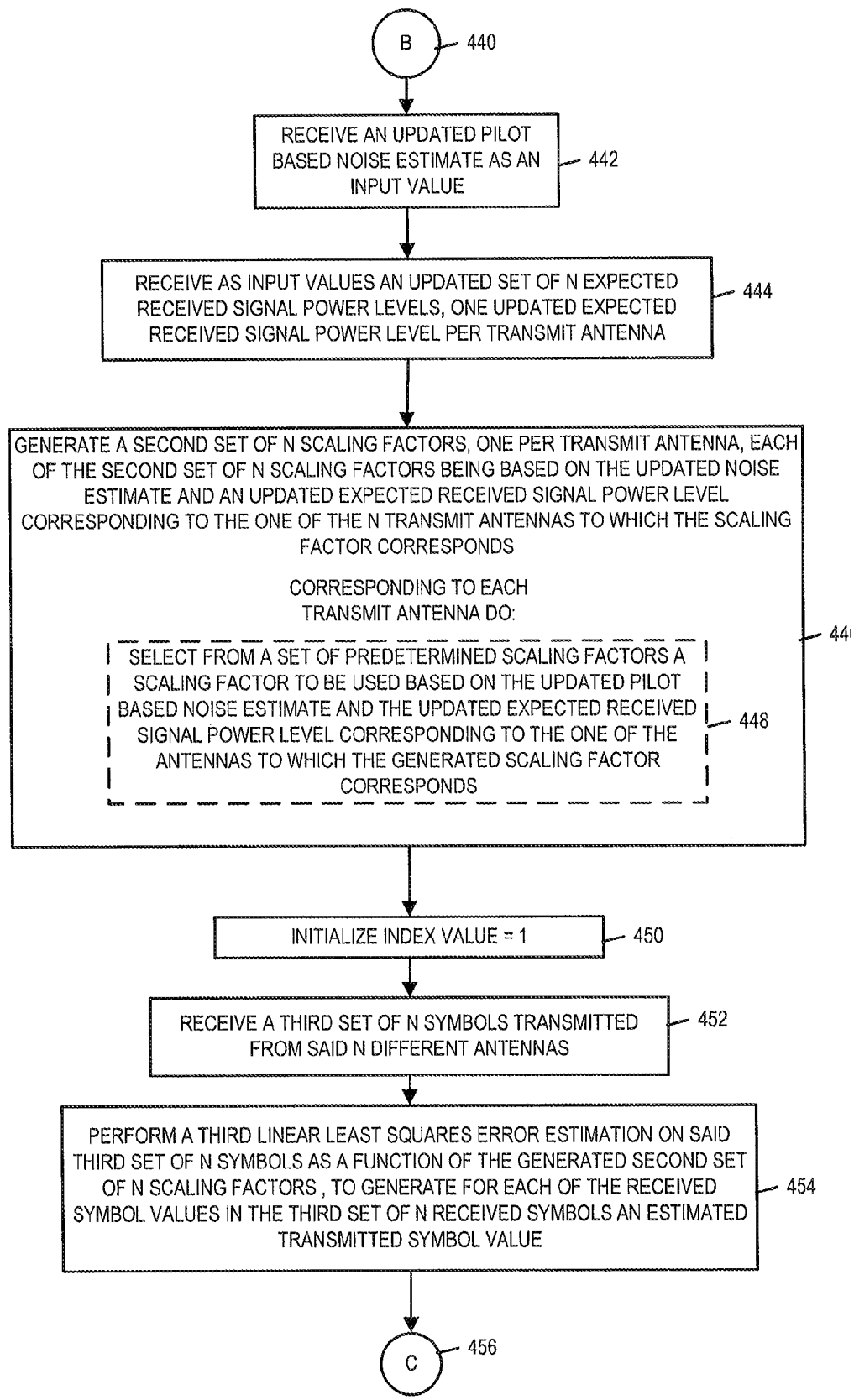
FIG. 4C is a third part of a flowchart of an exemplary method of operating a communications module for use in a communications device to generate an estimate of one or more transmitted symbols in accordance with various exemplary embodiments.

FIG. 4, comprising the combination of FIG. 4A, FIG. 4B, FIG. 4C and FIG. 4D is a flowchart 400 of an exemplary method of operating a communications module for use in a communications device to generate an estimate of one or more transmitted symbols in accordance with various exemplary embodiments. Steps 404 and 406 are optional steps which are included in some embodiments, e.g., an embodiment where the communications module is configurable and which may be operated at different times to receive and process signals from different numbers of transmit antennas, and are omitted in some other embodiments. Operation starts in step 402 where the device is powered on and initialized and proceeds from step 402 to step 404, if step 404 and 406 are included; or proceeds from step 402 to step 408 if steps 404 and 406 are omitted.

In step 404 the communications module determines a first number of transmit antennas from which signals are to be received. Then in step 406 the communications module configures the communications module at a first point in time to process the received signals transmitted from said first number of transmit antennas during a first time period, said configuring including setting the communications module to select scaling factors from a first set of predetermined scaling factors including a first number of predetermined scale factor values. Operation proceeds from step 406 to step 408.

In step 408 the communications module receives a pilot based noise estimate as an input value. Then, in step 410 the communications module receives as input values a set of N expected received signal power levels, one expected received signal power level per transmit antenna. In some embodiments the expected received signal power levels are based on received pilot signals which have been received over a time interval. Operation proceeds from step 410 to step 412.

In step 412 the communications module generates a first set of N scaling factors, one per transmit antenna, each of the first set of N scaling factors being based on the noise estimate and an expected received signal power level corresponding to the one of the N transmit antennas to which the scaling factor corresponds. N can be any positive integer value. In some embodiments, step 412 includes sub-step 414. In some such embodiments, sub-step 414 is performed corresponding to each of the transmit antennas. In sub-step 414 the communications module selects from a set of predetermined scaling factors a scaling factor to be used based on the pilot based noise estimate and the expected received signal power level corresponding to the one of the antennas to which the generated scaling factor corresponds. The set of predetermined scaling factors is, e.g., the first set of predetermined scaling factors of step 406. In some embodiments, the number of predetermined scaling factors in the set of predetermined scaling factors is predetermined. In some such embodiments, the number of predetermined scaling factors is a function of at least one of the number of transmit antennas and the dynamic signal range to be supported.

Operation proceeds from step 412 via connecting node A 416 to step 418, in which the communications module initializes an index value to 1. Operation proceeds from step 418 to step 420. In step 420 the communications module receives a first set of N symbols transmitted from said N different antennas. Then in step 422 the communications module performs a first linear least squares error estimation on said first set of N symbols as a function of the generated first set of N scaling factors, to generate for each of the received symbol values in the first set of N received symbols an estimated transmitted symbol value. In some embodiments, the first linear least squares error estimation is also performed based on a set of m channel estimates, one channel estimate corresponding to each of m receiver antennas, where m is a positive value. Thus the channel estimates are from a receive antenna perspective, and the number of receive antennas may be, and in some embodiments, sometimes are, different from the number of transmit antennas. Operation proceeds from step 422 to step 424.

In step 424 the communications module increments the index value by one. Operation proceeds from step 424 to step 426, in which the communications module receives a second set of N symbols transmitted from said N different antennas. Then in step 428 the communications module performs a second linear least squares error estimation on said second set of N symbols as a function of the generated first set of N scaling factors, to generate for each of the received symbol values in the second set of N received symbol values in the second set of N received symbols, an estimated transmitted symbol value. In various embodiments, the rate at which symbols are received and processed is faster than the rate at which scaling factors are selected. Operation proceeds from step 428 to step 430.

In step 430 the communications modules checks if the index value equal a maximum value, e.g., a counter threshold value used to determine when to generate a new set of scaling factors. If the index value does not equal the maximum value, then operation proceeds from step 430 to step 432, where the communications module increments the index value by one. Operation proceeds from step 432 to step 434 in which the communications module receives an additional set of N symbols transmitted from said N different antennas. Then, in step 436 the communications module performs a linear least squares error estimation on said additional set of N symbols as a function of the generated first set of N scaling factors to generate for each of the received symbol values in the additional set of N received symbols, an estimated transmitted symbol value. Operation proceeds from step 436 to the input of step 430.

Step 436 may be performed multiple times corresponding to multiple passes through the loop including steps 430, 432, 434, and 436. Linear least squares error estimation may, and sometimes is, performed on additional sets of n symbols using sets of channel estimates generated at different times, each set corresponding to a different symbol transmission time period, prior to generating a new set of n scaling factors. Thus, in some embodiments, channel estimation is performed at a faster rate than scaling factor selection. In some embodiments, the additional sets of N symbols correspond to multiple data transmission block, each data transmission block including multiple symbol transmission time period. Thus in some embodiments, the same scaling factor set is used for an extended time period during which data from multiple transmission blocks are received. In this example, the same scaling factor set is used for the time period including the received first set of symbols of step 420, the received second set of symbols of step 426 and one or more iterations of a received additional set of symbols of step 434.

In step 430, if the index value is determined to equal the maximum value then operation proceeds from step 430 to step 438. In step 438 the communications module generates multiple pilot based noise estimates prior to generating another set of N scaling factors. In various embodiments, channel noise estimation occurs at a faster rate than scaling factor selection. Operation proceeds from step 438 via connecting node B 440 to step 442. In step 442 the communications module receives an updated pilot based noise estimate as an input value. Operation proceeds from step 442 to step 444. In step 444 the communications module receives as input values an updated set of N expected received signal power levels, one updated expected received signal power level per transmit antenna. Operation proceeds from step 444 to step 446.

In step 446 the communications module generates a second set of N scaling factors, one per transmit antenna, each of the second set of N scaling factors being based on the updated noise estimate and an expected received signal power level corresponding to the one of the N transmit antennas to which the scaling factor corresponds. In some embodiments, step 446 includes sub-step 448. In some such embodiments sub-step 448 is performed for each transmit antenna. In sub-step 448 the communications module selects from a set of predetermined scaling factors a scaling factor to be used based on the updated pilot based noise estimate and the updated expected received signal power level corresponding to the one of the antennas to which the generated scaling factor corresponds. Operation proceeds from step 446 to step 450.

In step 450 the communications device initializes the index value equal to one. Then, in step 452 the communications device receives a third set of N symbols transmitted from said N different antennas. Operation proceeds from step 452 to step 454. In step 454 the communications module performs a third linear least squares error estimation on said third set of N symbols as a function of the generated second set of N scaling factors to generate for each of the received symbol values in the third set of received symbols an estimated transmitted symbol value. Operation proceeds from step 454 via connecting node C 456 to step 458.

In step 458 the communications module increments the index value by one. Then, in step 460 the communications module receives a fourth set of N symbols transmitted from said N different antennas. Operation proceeds from step 460 to step 462. In step 462, the communications module performs a fourth linear least squares error estimation on said fourth set of N symbols as a function of the generated second set of N scaling values, to generate for each of the received symbol values in the fourth set of N received symbol values an estimated transmitted symbol value. Operation proceeds from step 462 to step 464.

In step 464 the communications modules checks if the index value equal a maximum value. If the index value does not equal the maximum value, then operation proceeds from step 464 to step 466, where the communications module increments the index value by one. Operation proceeds from step 466 to step 468 in which the communications module receives another set of N symbols transmitted from said N different antennas. Then, in step 470 the communications module performs a linear least squares error estimation on said another set of N symbols as a function of the generated second set of N scaling factors to generate for each of the received symbol values in the another set of N received symbols, an estimated transmitted symbol value. Operation proceeds from step 470 to the input of step 464.

In step 464, if the index value is determined to equal the maximum value then operation proceeds from step 464 to one of optional step 472 and step 476. Steps 472 and 474 are optional steps included in some embodiments and omitted in other embodiments. In step 472 the communications module determines a second number of transmit antennas from which signals are to be received. Then, in step 474 the communications module configures the communications module at a second point in time to process the received signals transmitted from said second number of antennas during a second time period, said configuring including setting the communications module to select the scaling factors from a second set of predetermined scaling factors including a second number of predetermined scale factor values which is different from said first number. In one example, where N is 2, the first number of predetermined scale factor values is 4 and when N is one the second number of predetermined scale factor values is 2. Operation proceeds from step 474 to step 476 in which the communications module generates multiple pilot based noise estimates. Operation proceeds from step 476 via connecting node D 478 to the input of step 408 where the communications module receives a pilot based noise value as an input value.

Figure 5:
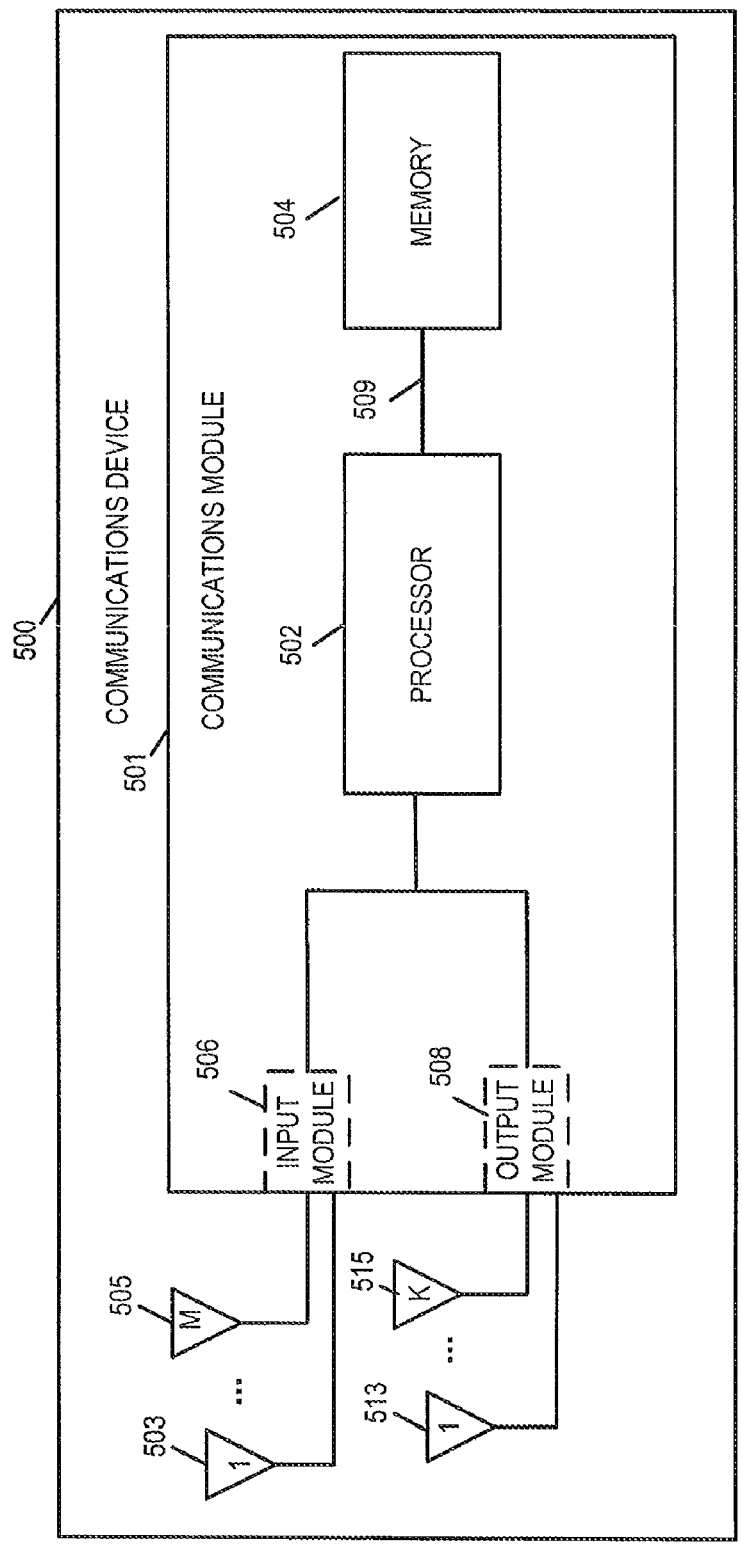
FIG. 5 is a drawing of an exemplary communications device, in accordance with an exemplary embodiment.

FIG. 5 is a drawing of an exemplary communications device 500, in accordance with an exemplary embodiment. Exemplary communications device 500 is, e.g., one of the communications devices of FIG. 3. Exemplary communications device 500 includes a communications module 501. Communications module 500 may, and sometimes does, implement a method in accordance with flowchart 400 of FIG. 4.

Communications module 501 includes a processor 502 and memory 504 coupled together via a bus 509 over which the various elements (502, 504) may interchange data and information. Communications module 501 further includes an input module 506 and an output module 508 which may be coupled to processor 502 as shown. However, in some embodiments, the input module 506 and output module 508 are located internal to the processor 502. Input module 506 can receive input signals. Input module 506 can, and in some embodiments does, include a wireless receiver and/or a wired or optical input interface for receiving input. Output module 508 may include, and in some embodiments does include, a wireless transmitter and/or a wired or optical output interface for transmitting output. In this example, the input module 506 is coupled to a plurality of receive antennas (receive antenna 1 503, . . . , receive antennas M 505) and the output module 508 is coupled to a plurality of transmit antennas (transmit antenna 1 513, . . . , transmit antennas K 515). In some embodiments, the same one or more antennas are used for both input and output. In some embodiments, a single antenna is used for input and a single antenna is used for output.

Processor 502 is configured to: generate a first set of n scaling factors, one per transmit antenna, each of the n scaling factors being based on a noise estimate and an expected received signal power level corresponding to the one of the n transmit antennas to which the scaling factor corresponds; receive a first set of n symbols transmitted from said n different antennas; and perform a first linear least squares error estimation on said first set of n symbols, as a function of the generated first set of n scaling factors, to generate for each of the received symbols in the first set of n received symbols an estimated transmitted symbol value. Processor 502 is further configured to: receive the pilot based noise estimate as an input value; and receive as input values, a set of n expected received signal power levels, where n is a positive integer, one expected received signal power level per transmit antenna. The expected received power levels may be based on received pilot signals which were received over a time period.

Processor 502 is further configured to: receive a second set of n symbols transmitted from said n different antennas; and perform a second linear least squares error estimation on said second set of n symbols, as a function of the generated first set of n scaling factors, to generate for each of the received symbols in the second set of n received symbols an estimated transmitted symbol value. In various embodiments, the rate at which symbols are received and processed is faster than rate at which scaling factors are selected. Thus, a selected scaling factor may be held and used for a time interval including multiple symbol transmission time periods, e.g., a predetermined number of an orthogonal frequency division multiplexing (OFDM) symbol transmission time periods in a timing structure.

In some embodiments, processor 502 is configured to perform said first linear least squares error estimation based on a set of m channel estimates, one channel estimate corresponding to each m receiver antennas, where m is a positive value as part of being configured to perform a first linear least squares error estimation. In some embodiment, channel estimates are from a receive antenna perspective, and the number of receive antennas may be different from the number of transmit antennas from which signals are being received and processed.

Processor 502 is further configured to: perform a linear least squares error estimation on additional sets of n symbols using sets of channel estimates generated at different times, each set corresponding to a different symbol transmission time period, prior to generating a new set of n scaling factors. In various embodiments, channel estimation is performed at a faster rate than scaling factor selection. In some embodiments, the additional sets of n symbols correspond to multiple data transmission blocks, each data transmission block including multiple symbol transmission time periods. In some embodiments, the same scaling factor set is used for extended time period during which data from multiple transmission blocks are received.

In various embodiments, processor 502 is further configured to: generate multiple pilot based noise estimates prior to generating another set of n scaling factors. In various embodiments, channel noise estimation occurs at a faster rate than scaling factor selection.

Processor 502 is further configured to: generate a second set of n scaling factors, one per transmit antenna, each of the second set of n scaling factors being based on an updated noise estimate and an updated expected received signal power level corresponding to the one of the n transmit antennas to which the scaling factor corresponds. Processor 502, in some embodiments, is configured to select from a set of predetermined scaling factors a scaling factor to be used based on the pilot based noise estimate and the expected received signal power level corresponding to the one of the antennas to which the generated scaling factor corresponds, as part of being configured to generate a first set of n scaling factors, one per n different antennas.

In some embodiments, the number of predetermined scaling factors in said set of predetermined scaling factors is predetermined. In some embodiments, the number of predetermined scaling factors is a function of at least one of the number of transmit antennas and the dynamic signal range to be supported. In one exemplary embodiment, when n is 2, the first number of predetermined scale factor values is 4 and when n is 1, the second number of predetermined scale factor values is 2.

In various embodiments, e.g., an embodiment in which processor 502 is part of a configurable device which may operate at different times to receive signals from different numbers of transmit antennas, processor 502 is further configured to: configure the communications module 501 at a first point in time to process received signals transmitted from a first number of antennas during a first time period, said configuring including setting said communications module 501 to select the scaling factors from a first set of predetermined scaling factors including a first number of predetermined scale factor values; and configure the communications module 501 at a second point in time to process received signals transmitted from a second number of antennas during a second time period, said configuring including setting said communications module to select the scaling factors from a second set of predetermined scaling factors including a second number of predetermined scale factor values which is different from said first number.

Figure 6A:
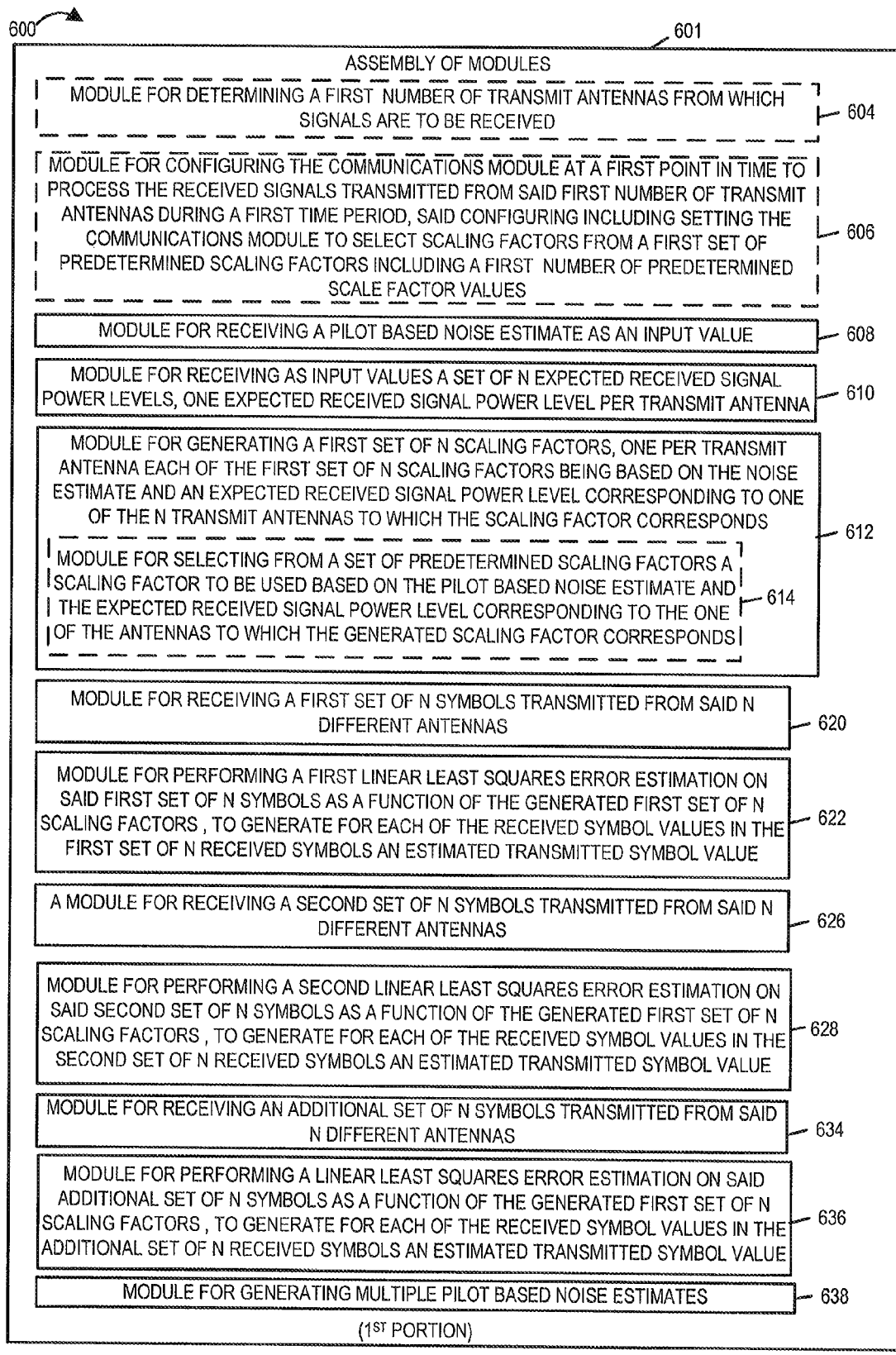
FIG. 6A is a first portion of an assembly of modules which can, and in some embodiments is, used in the communications device illustrated in FIG. 5.
Figure 6B:
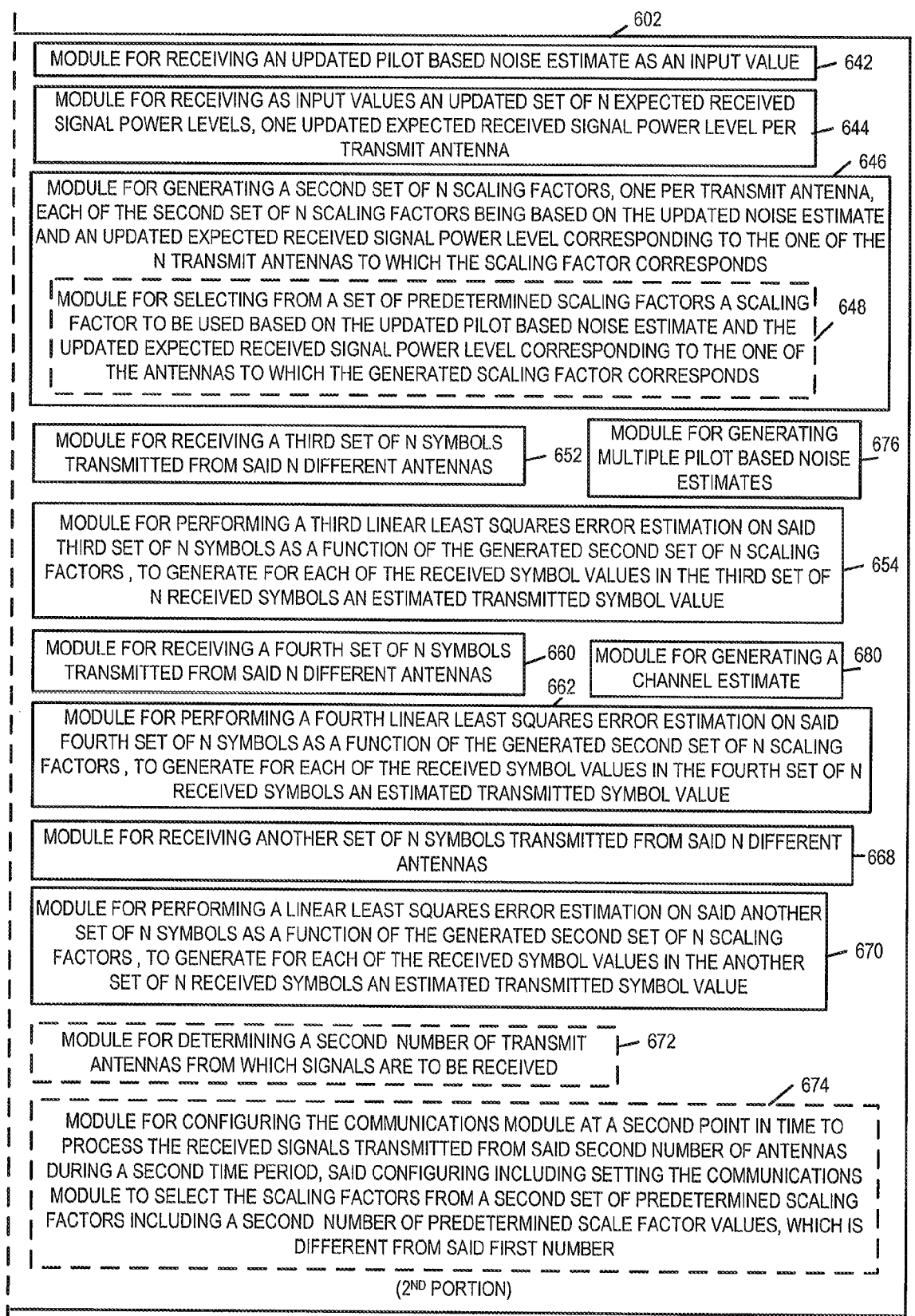
FIG. 6B is a second portion of an assembly of modules which can, and in some embodiments is, used in the communications illustrated in FIG. 5.

FIG. 6, comprising the combination of FIG. 6A and FIG. 6B is an assembly of modules 600 which can, and in some embodiments is, used in the communications module 501 illustrated in the communications device 500 of FIG. 5. Assembly of modules 600 includes a first portion 601 and a second portion 602. The modules in the assembly 600 can be implemented in hardware within the processor 502 of FIG. 5, e.g., as individual circuits. Alternatively, the modules may be implemented in software and stored in the memory 504 of the communications module 501 shown in FIG. 5. While shown in the FIG. 5 embodiment as a single processor, e.g., computer, it should be appreciated that the processor 502 may be implemented as one or more processors, e.g., computers. When implemented in software the modules include code, which when executed by the processor, configure the processor, e.g., computer, 502 to implement the function corresponding to the module. In some embodiments, processor 502 is configured to implement each of the modules of the assembly of module 600. In embodiments where the assembly of modules 600 is stored in the memory 504, the memory 504 is a computer program product comprising a computer readable medium comprising code, e.g., individual code for each module, for causing at least one computer, e.g., processor 502, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 6 control and/or configure the communications module 501 of communications device 500 or elements therein such as the processor 502, to perform the functions of the corresponding steps illustrated in the method flowchart 400 of FIG. 4.

Assembly of modules 600, comprising the combination of 1st portion 601 and second potion 602, includes a module 608 for receiving a pilot based noise estimate as an input value, a module 610 for receiving as input values a set of N expected received signal power levels, one expected received signal power level per transmit antenna, and a module 612 for generating a first set of N scaling factors, one per transmit antenna, each of the first set of N scaling factors being based on the noise estimate and an expected received signal power level corresponding to the one of the N transmit antennas to which the scaling factor corresponds. In some embodiments, module 612 includes a module 614 for selecting from a set of predetermined scaling factors a scaling factor to be used based on the pilot based noise estimate and the expected received signal power level corresponding to the one of the antennas to which the generated scaling factor corresponds. In some embodiments, the number of predetermined scaling factors in said set of predetermined scaling factors is predetermined. In some such embodiments, the number of predetermined scaling factors is a function of at least one of the number of transmit antennas and the dynamic signal range to be supported.

Assembly of modules 600 further includes a module 620 for receiving a first set of N symbols transmitted from said N different antennas, and a module 622 for performing a first linear least squares error estimation on said first set of N symbols as a function of the generated first set of N scaling factors to generate for each of the received symbols values in the first set of N received symbols an estimated transmitted symbol value. In various embodiments, the module 622 for performing a first linear least squares estimation also performs said estimation based on a set a channel estimates, one channel estimate corresponding to each of m receiver antennas, where m is a positive value.

Assembly of modules 600 further includes a module 626 for receiving a second set of N symbols transmitted from said N different antennas, a module 628 for performing a second linear least squares error estimation on said second set of N symbols as a function of the generated first set of N scaling factors to generate for each of the received symbols values in the second set of N received symbols an estimated transmitted symbol value, a module 634 for receiving an additional set of N symbols transmitted from said N different antennas, a module 636 for performing a linear least squares error estimation on said additional set of N symbols as a function of the generated first set of N scaling factors to generate for each of the received symbol values in the additional set of N received symbol values an estimated transmitted symbol value. In various embodiments, module 636 performs linear least squares estimations on additional sets of n symbols using sets of channel estimates generated at different times, each set corresponding to a different symbol transmission time period, prior to module 646 generating a new scale factor. In some embodiments, the additional sets of n symbols corresponds to multiple data transmission blocks, each data transmission block including multiple symbols transmission time period. Assembly of modules 600 further includes a module 638 for generating multiple pilot based noise estimates, a module 642 for receiving an updated pilot based noise estimate as an input value, a module 644 for receiving as input values an updated set of N expected received signal power levels one updated received signal power level per transmit antenna, and a module 646 for generating a second set of N scaling factors one per transmit antenna, each of the second set of N scaling factors being based on the updated noise estimate and an updated expected received signal power level corresponding to the one of the N transmit antennas to which the scaling factor corresponds. In some embodiments, module 646 includes a module 648 for selecting from a set of predetermined scaling factors a scaling factor to be used based on the updated pilot based noise estimate and the updated expected received signal power level corresponding to the one of the antennas to which the generated scaling factor corresponds.

Assembly of module 600 further includes a module 652 for receiving a third set of N symbols transmitted from said N different antennas, a module 654 for performing a third linear least squares error estimation in said third set of N symbols as a function of the generated second set of N scaling factors to generate for each of the received symbol values in the third set of N received symbols an estimated transmitted symbol value, a module 660 for receiving a fourth set of N symbols transmitted from said N different antennas, a module 662 for performing a fourth linear least squares error estimation on said fourth set of N symbols as a function of the generated second set of N scaling factors to generate for each of the received symbol values in the fourth set of N receives symbols an estimated transmitted symbol value, a module 668 for receiving another set of N symbol transmitted from said N different antennas, a module 670 for performing a linear least squares error estimation on said another set of N symbols as a function of the generated second set of N scaling factors, to generate for each of the received symbol values in the another set of N received symbols an estimated transmitted symbol value, and a module 680 for generating a channel estimate.

In some embodiments assembly of modules 600 further includes: a module 604 for determining a first number of transmit antennas from which signals are to be received, and a module 606 for configuring the communications module at a first point in time to process the received signals transmitted from said first number of transmit antennas during a first time period, said configuring including setting the communications module to select scaling factors from a first set of predetermined scaling factors including a first number of predetermined scale factor values.

In various embodiments assembly of modules further includes a module 672 for determining a second number of transmit antennas from which signals are to be received and a module 674 for configuring the communications module at a second point in time to process the received signals transmitted from the second number of antennas during a second time period, said configuring including setting the communications module to select the scaling factors from a second set of predetermined scaling factors including a second number of predetermined scale factor values, which is different from said first number. In one example, when N is 2, the first number of predetermined scaling factor values is 4 and when N is one the second number of predetermined scaling factor values is 2.

Figure 7:
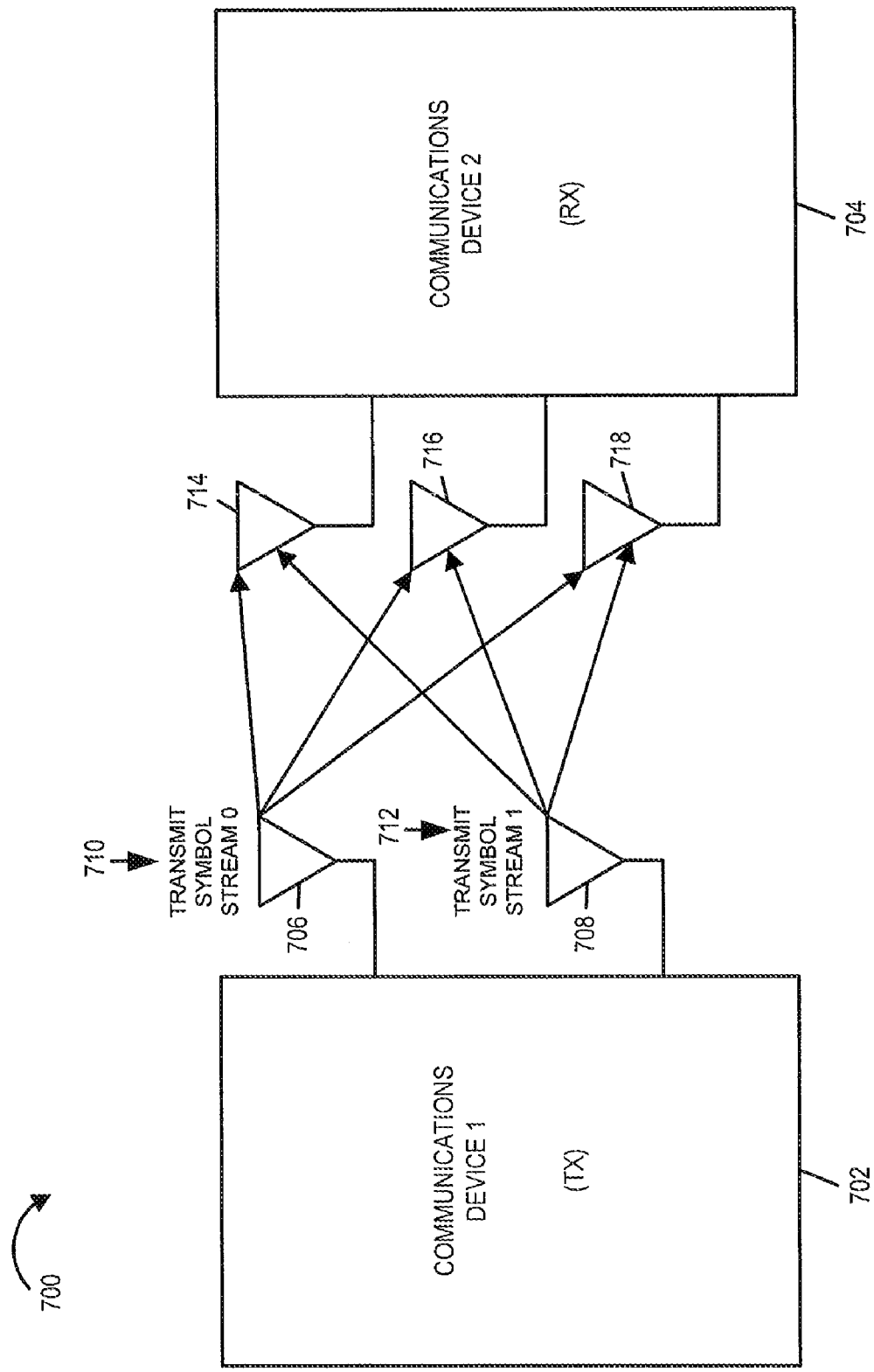
FIG. 7 is a drawing illustrating an exemplary communications device, in accordance with an exemplary embodiment, receiving and processing information corresponding to two different transmit symbol streams transmitted from two different antennas, respectively, of the same transmitter device.

FIG. 7 is a drawing 700 illustrating exemplary first communications device, communications device 1 702, which is functioning as a transmitter device, transmitting signals to exemplary second communications device, communications device 2 704, which is functioning as a receiver device. Communications device 1 702 includes antenna 706 which is transmitting exemplary symbol stream 0 710 and antenna 708 which is transmitting exemplary symbol stream 1 712. Communications device 2 704 includes receive antennas (714, 716, 718), and recovers information communicated by both symbol stream 0 710 and symbol stream 1 712. The communications devices (702, 704) may be any of the exemplary communications devices of system 300 of FIG. 3. Communications device 2 704 is, e.g., a communications device which performs a method in accordance with flowchart 400 of FIG. 4 and/or is implemented in accordance with FIG. 5 and FIG. 6.

Figure 8:
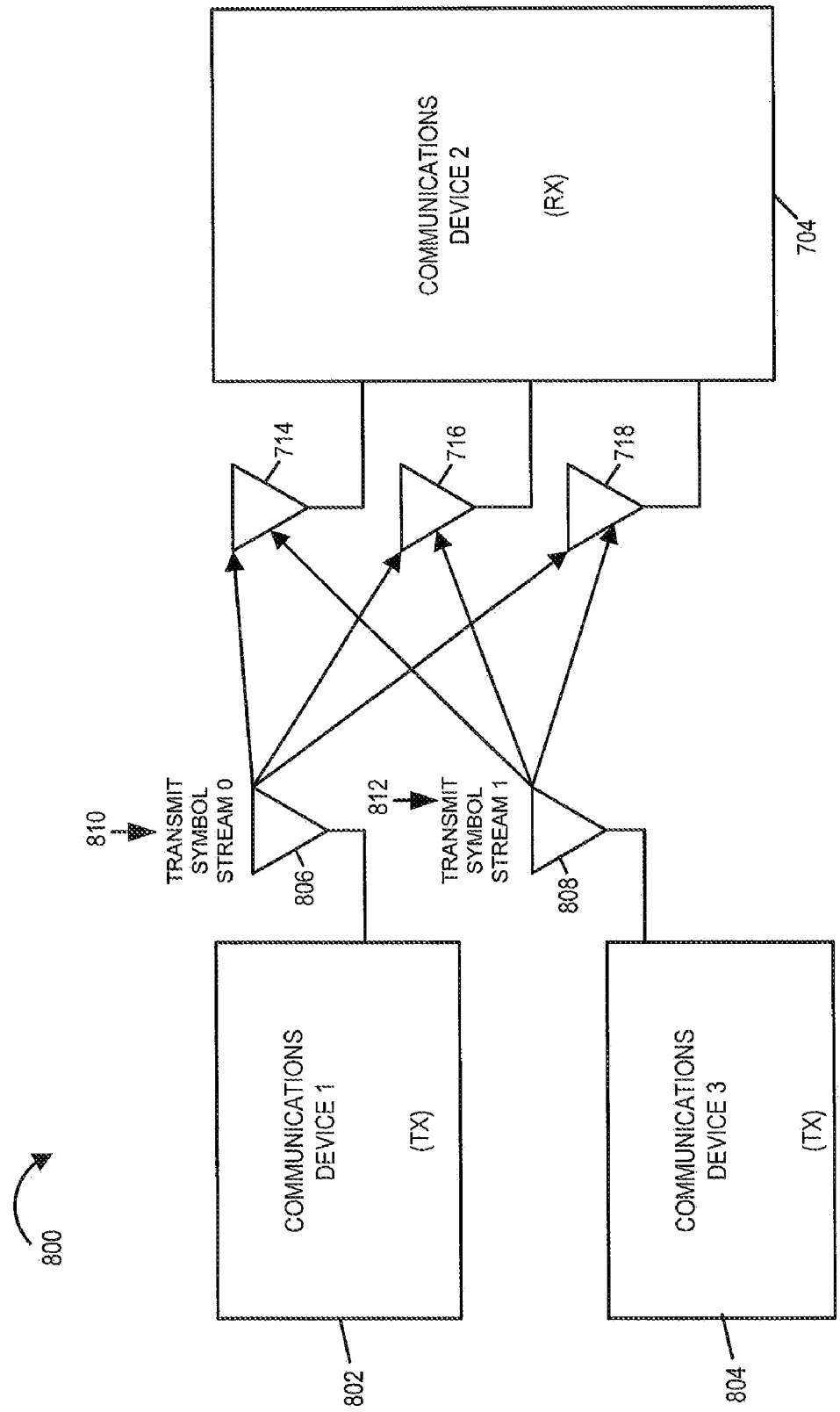
FIG. 8 is a drawing illustrating an exemplary communications device, in accordance with an exemplary embodiment, receiving and processing information corresponding to two different transmit symbol streams transmitted from two different antennas, respectively, the two different transmit antennas corresponding to different transmit devices.

FIG. 8 is a drawing 800 illustrating exemplary first communications device, communications device 1 802, which is functioning as a transmitter device, transmitting signals to exemplary second communications device, communications device 2 704, which is functioning as a receiver device. Drawing 800 also illustrates exemplary third communications device, communications device 3 804, which is functioning as a transmitter device, transmitting signals to exemplary second communications device, communications device 2 704, which is functioning as a receiver device. Communications device 1 802 includes antenna 806 which is transmitting exemplary symbol stream 0 810. Communications device 3 804 includes antenna 808 which is transmitting exemplary symbol stream 1 812. Communications device 2 704 includes receive antennas (714, 716, 718), and recovers information communicated by both symbol stream 0 810 and symbol stream 1 812. The communications devices (802, 704, 804) may be any of the exemplary communications devices of system 300 of FIG. 3. Communications device 2 704 is, e.g., a communications device which performs a method in accordance with flowchart 400 of FIG. 4 and/or is implemented in accordance with FIG. 5 and FIG. 6.

Figure 9:
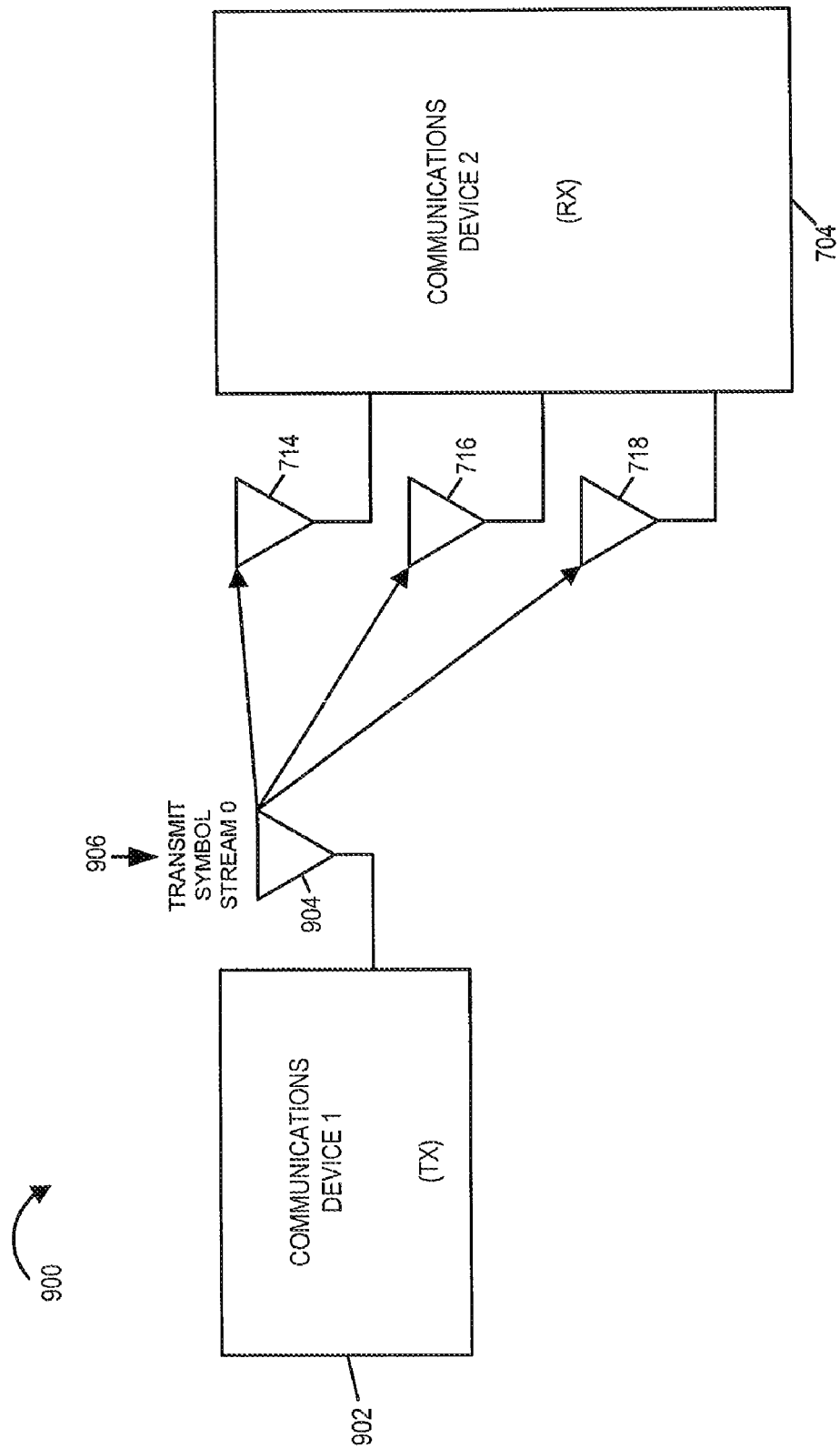
FIG. 9 is a drawing illustrating an exemplary communications device, which includes multiple receive antennas and is implemented in accordance with an exemplary embodiment, receiving and processing information corresponding to a transmit symbol stream transmitted from a single transmit antenna of a single transmitter device.

FIG. 9 is a drawing 900 illustrating exemplary first communications device, communications device 1 902, which is functioning as a transmitter device, transmitting signals to exemplary second communications device, communications device 2 704, which is functioning as a receiver device. Communications device 1 902 includes antenna 904 which is transmitting exemplary symbol stream 0 906. Communications device 2 704 includes receive antennas (714, 716, 718), and recovers information communicated by symbol stream 0 906. The communications devices (902, 704) may be any of the exemplary communications devices of system 300 of FIG. 3. Communications device 2 704 is, e.g., a communications device which performs a method in accordance with flowchart 400 of FIG. 4 and/or is implemented in accordance with FIG. 5 and FIG. 6.

Figure 10:
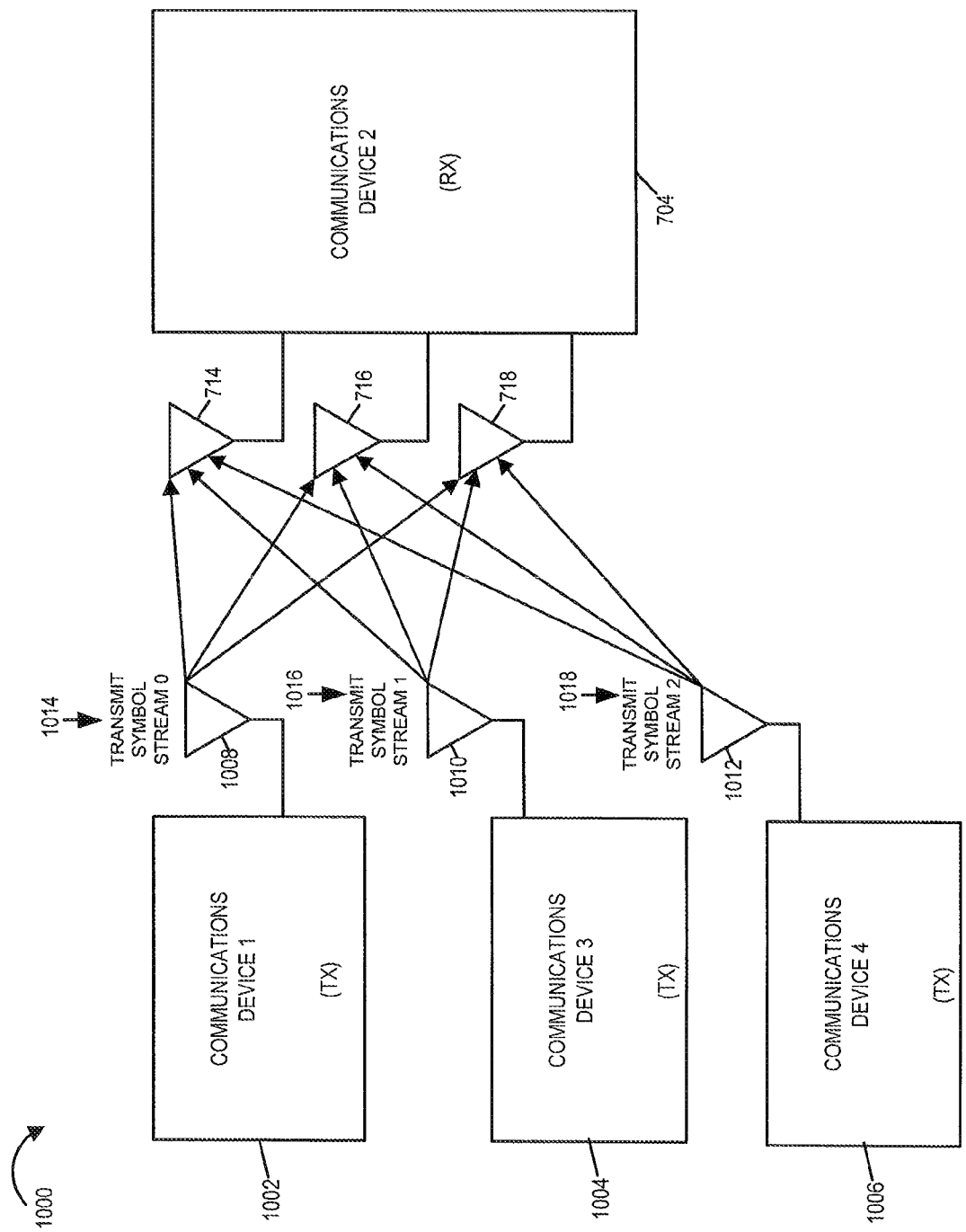
FIG. 10 is a drawing illustrating an exemplary communications device, in accordance with an exemplary embodiment, receiving and processing information corresponding to three different transmit symbol streams transmitted from three different antennas, respectively, the three different transmit antennas corresponding to different transmit devices.

FIG. 10 is a drawing 1000 illustrating exemplary first communications device, communications device 1 1002, which is functioning as a transmitter device, transmitting signals to exemplary second communications device, communications device 2 704, which is functioning as a receiver device. Drawing 1000 also illustrates exemplary third communications device, communications device 3 1004 which is functioning as a transmitter device, transmitting signals to exemplary second communications device, communications device 2 704, which is functioning as a receiver device. Drawing 1000 also illustrates exemplary fourth communications device, communications device 4 1006, which is functioning as a transmitter device, transmitting signals to exemplary second communications device, communications device 2 704, which is functioning as a receiver device. Communications device 1 1002 includes antenna 1008 which is transmitting exemplary symbol stream 0 1014. Communications device 3 1004 includes antenna 1010 which is transmitting exemplary symbol stream 1 1016. Communications device 4 1006 includes antenna 1012 which is transmitting exemplary symbol stream 2 1018. Communications device 2 704 includes receive antennas (714, 716, 718), and recovers information communicated by symbol stream 0 1014, symbol stream 1 1016 and symbol stream 2 1018. The communications devices (1002, 704, 1004, 1006) may be any of the exemplary communications devices of system 300 of FIG. 3. Communications device 2 704 is, e.g., a communications device which performs a method in accordance with flowchart 400 of FIG. 4 and/or is implemented in accordance with FIG. 5 and FIG. 6.

Figure 11:
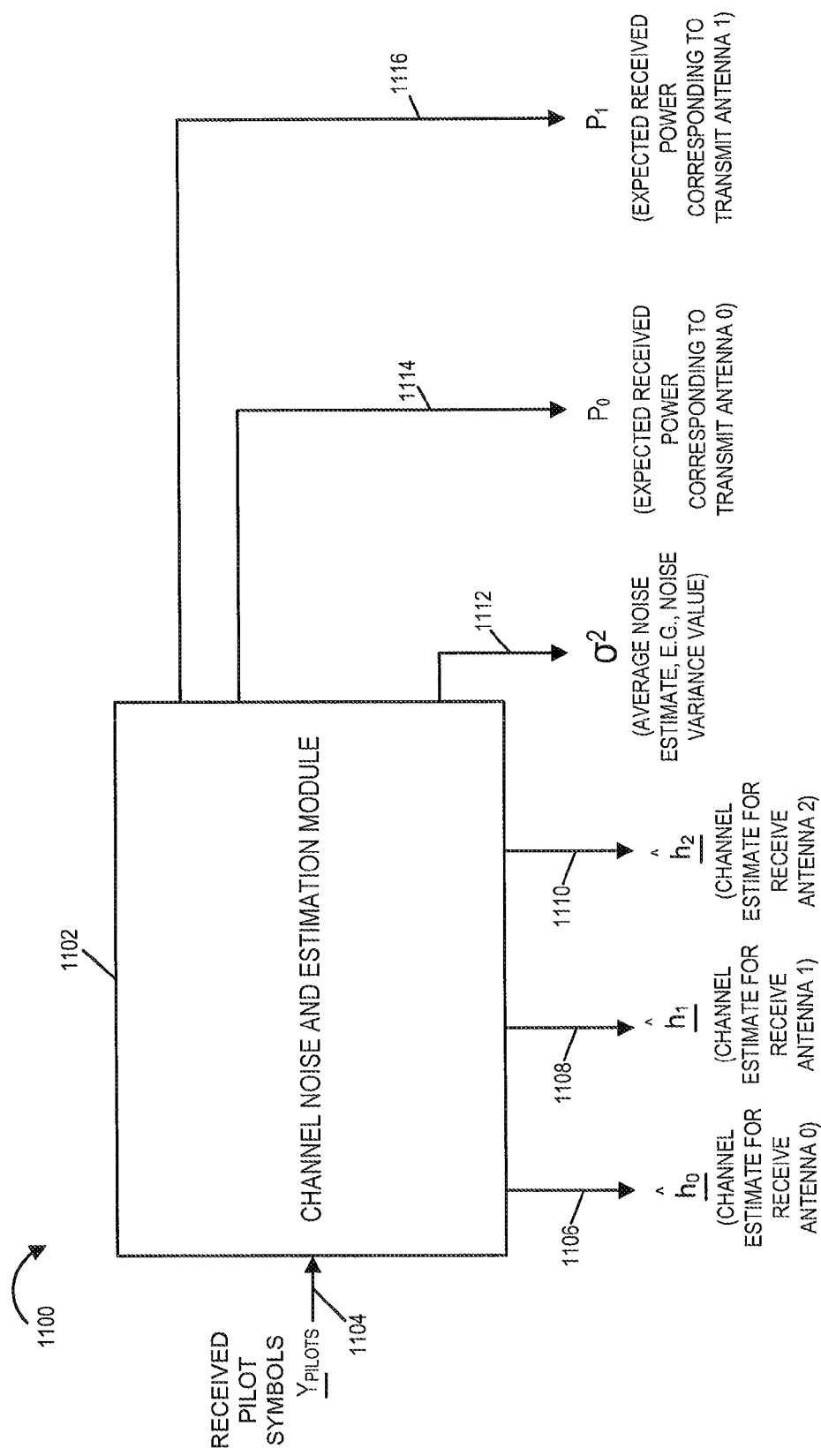
FIG. 11 is a drawing illustrating an exemplary channel noise and estimation module which is included as part of a communications device in accordance with an exemplary embodiment.

FIG. 11 is a drawing 1100 illustrating an exemplary channel noise and estimation module 1102 which is included as part of a communications device, e.g., communications device 2 704 of FIGS. 7-10, in accordance with an exemplary embodiment. In the example, of FIG. 11 consider that the channel noise and estimation module 1102 is processing received pilot signals so that channel and noise estimation information can be determined which is to be used to recover two transmit data symbols streams from two transmit antennas, e.g., as shown in the example of FIG. 7 or FIG. 8. Channel noise and estimation module receives received pilots symbols as represented by pilot vector $Y_{pilots}$ 1104 which includes received pilot symbols corresponding to transmit antenna 0 and transmit antenna 1. The channel noise and estimation module 1102 processes the received pilot symbols 1104 and generates as outputs: average noise estimate $\sigma^2$ 1112, e.g., a noise variance value, an expected received power corresponding to transmit antenna 0 $P_0$ 1114, and an expected received power corresponding to transmit antenna 1 $P_1$ 1116. Channel noise and estimation module 1102 also generates and outputs: a channel estimate for receive antenna 0 which is estimate $h_0$ 1106, a channel estimate for receive antenna 1 which is estimate $h_1$ 1108, and a channel estimate for receive antenna 2 which is estimate $h_2$ 1110.

It should be appreciated that if the communications device was configured to recover transmit symbol streams corresponding to three transmit antennas as shown in FIG. 10, channel noise and estimation module would also generate and output an expected received power corresponding to transmit antenna 2. Alternatively, if the communications device was configured to recover a single transmit symbol stream as shown in the example of FIG. 9, then expected received power corresponding to transmit antenna 0 $P_0$ 1114 would be generated and output, but expected received power corresponding to transmit antenna 1 $P_1$ 1116 would not be generated and output.

Figure 12:
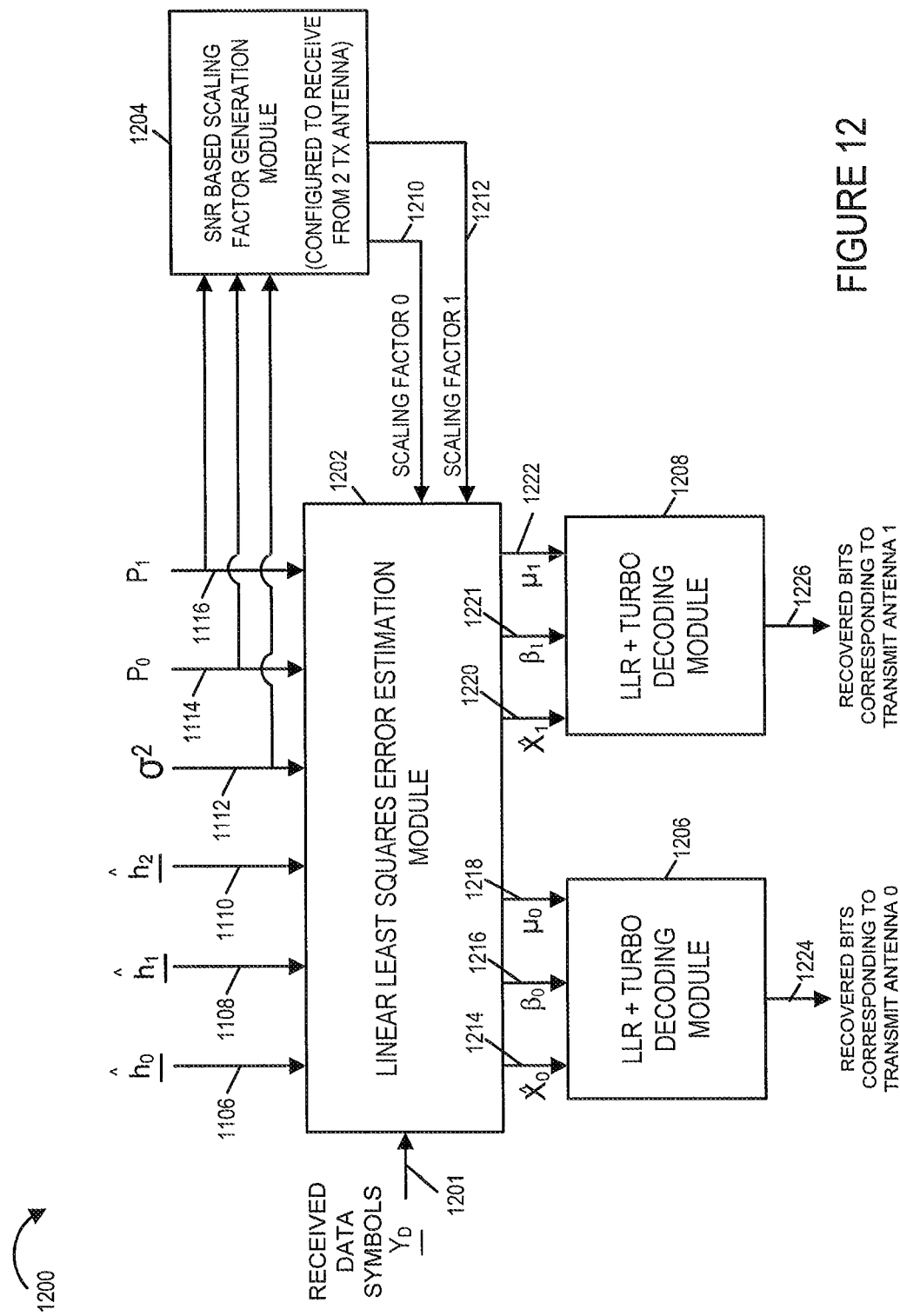
FIG. 12 is a drawing illustrating an exemplary signal to noise ratio (SNR) based scaling factor generation module coupled to a linear least squares estimation module, wherein one or more scaling factors generated by the scaling factor generation module are used by the linear least squares estimation module in its processing operations.

FIG. 12 is a drawing 1200 illustrating an exemplary linear least squares error estimation module 1202, an exemplary SNR based scaling factor generation module 1204, an exemplary first log-likelihood ratio (LLR)+turbo decoding module 1206, and an exemplary second LLR+turbo decoding module 1208, which is included as part of a communications device, e.g., communications device 2 704 of FIGS. 7-10, in accordance with an exemplary embodiment. In some other embodiments, an alternative decoding approach to turbo decoding may be used. In the example of FIG. 12 consider that the communications device is configured to recover two transmit data symbols streams from two transmit antennas, e.g., as shown in the example of FIG. 7 or FIG. 8.

SNR based scaling factor generation module 1204, which is configured to support reception from 2 transmit antennas, receives as input average noise estimate $\sigma^2$ 1112, expected received power corresponding to transmit antenna 0 $P_0$ 1114 and expected received power corresponding to transmit antenna 1 $P_1$ 1116. SNR based scaling factor generation module 1204 generates two scaling factors (scaling factor 0 1210 and scaling factor 1 1212) which are output to linear least squares error estimation module 1202. Scaling factor 0 1210 corresponds to transmit antenna 0 and is used to scale values related to the processing and/or recovery of symbol stream 0 information to try to avoid overflow and/or underflow conditions. Scaling factor 1 1212 corresponds to transmit antenna 1 and is used to scale values related to the processing and/or recovery of symbol stream 1 information to try to avoid overflow and/or underflow conditions.

Linear least squares error estimation module 1202 receives as input: scaling factor 0 1210, scaling factor 1 1212, channel estimates (estimate $h_0$ 1106 for receive antenna 0, estimate $h_1$ 1108 for receive antenna 1, estimate $h_2$ 1110 for receive antenna 2), average noise estimate $\sigma^2$ 1112, expected received power corresponding to transmit antenna 0 $P_0$ 1114, and expected received power corresponding to transmit antenna 1 $P_1$ 1116. In addition the linear least squares error estimation module 1202 receives as input received data symbols corresponding to the two transmit antennas as indicated by the vector $Y_D$ 1201 which are to be processed.

Linear least squares error estimation module 1202, performs processing including using scaling factor 0 1210, and generates outputs corresponding to transmit antenna 0. The outputs include: an estimate of a transmitted symbol from transmit antenna 0, estimate $X_0$ 1214, a gain slicing parameter $\beta_0$ 1216, and a variance slicing parameter $\mu_0$ 1218. The outputs (1214, 1216, 1218) are used as inputs to the LLR+turbo decoding module 1206 which recovers bits corresponding to transmit antenna 0 1224.

Linear least squares error estimation module 1202, performs processing including using scaling factor 1 1212, and generates outputs corresponding to transmit antenna 1. The outputs include: an estimate of a transmitted symbol from transmit antenna 1, estimate $X_1$ 1220, a gain slicing parameter $\beta_1$ 1221, and a variance slicing parameter $\mu_1$ 1222. The outputs (1220, 1221, 1222) are used as inputs to the LLR+turbo decoding module 1208 which recovers bits corresponding to transmit antenna 1 1226.

In some embodiments, the channel estimate occurs once per transmission block or transmission segment. In some such embodiments, the SNR changes very slowly, e.g., over multiple data transmission blocks, and can remain static over a relatively long amount of time. Thus, in such an embodiment, the SNR changes at a lower rate than the channel estimation rate changes. In some embodiments, a set of scaling factors are determined, e.g., selected, as a function of a set of SNRs, and remain in use by the LLSE estimation module for a relatively long amount of time, e.g., for multiple data transmission blocks. In comparison, the LLSE processing, which utilizes the channel estimates and determined scaling factors, is done on a per symbol basis.

Figure 13:
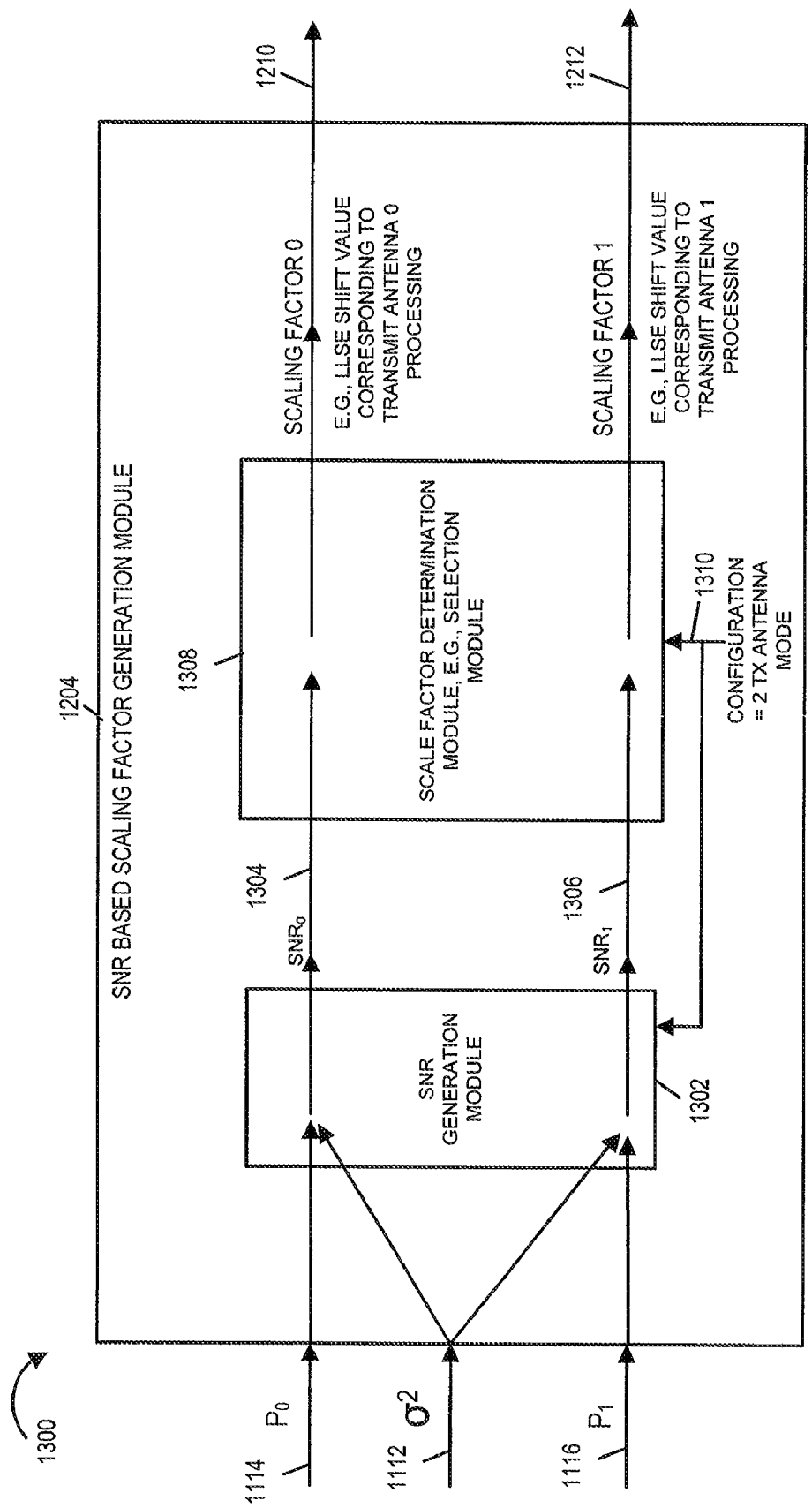
FIG. 13 is a drawing illustrating a more detailed representation of one embodiment of SNR based scaling factor generation module shown in FIG. 12.

FIG. 13 is a drawing 1300 illustrating a more detailed representation of one embodiment of SNR based scaling factor generation module 1204 as shown in FIG. 12. SNR based scaling factor generation module 1204 includes an SNR generation module 1302 and a scale factor determination module 1308, e.g., a selection based module. As shown in FIG. 13 the SNR based scaling factor generation module is configured for a two transmit antenna mode of operation as indicated by control setting signal 1310. One SNR is generated per transmit antennas by SNR generation module 1302 and one scaling factor is generated per transmit antenna by scale factor determination module 1308.

SNR generation module 1304 uses noise variance value $\sigma^2$ 1112 and expected received power corresponding to transmit antenna 0 $P_0$ 1114 to generate $SNR_0$ 1304 which corresponds to transmit antenna 0. SNR generation module 1304 uses noise variance value $\sigma^2$ 1112 and expected received power corresponding to transmit antenna 1 $P_1$ 1116 to generate $SNR_1$ 1306 which corresponds to transmit antenna 1.

Scale factor determination module 1308 determines, e.g., selects, a scaling factor as a function of $SNR_0$ 1304, resulting in scaling factor 0 1210, which is an output. In some embodiments, scaling factor 0 is, e.g., a LLSE shift value corresponding to transmit antenna 0. Scale factor determination module 1308 determines, e.g., selects, a scaling factor as a function of $SNR_1$ 1306, resulting in scaling factor 1 1212, which is an output. In some embodiments, scaling factor 1 is, e.g., a LLSE shift value corresponding to transmit antenna 1.

Figure 14:
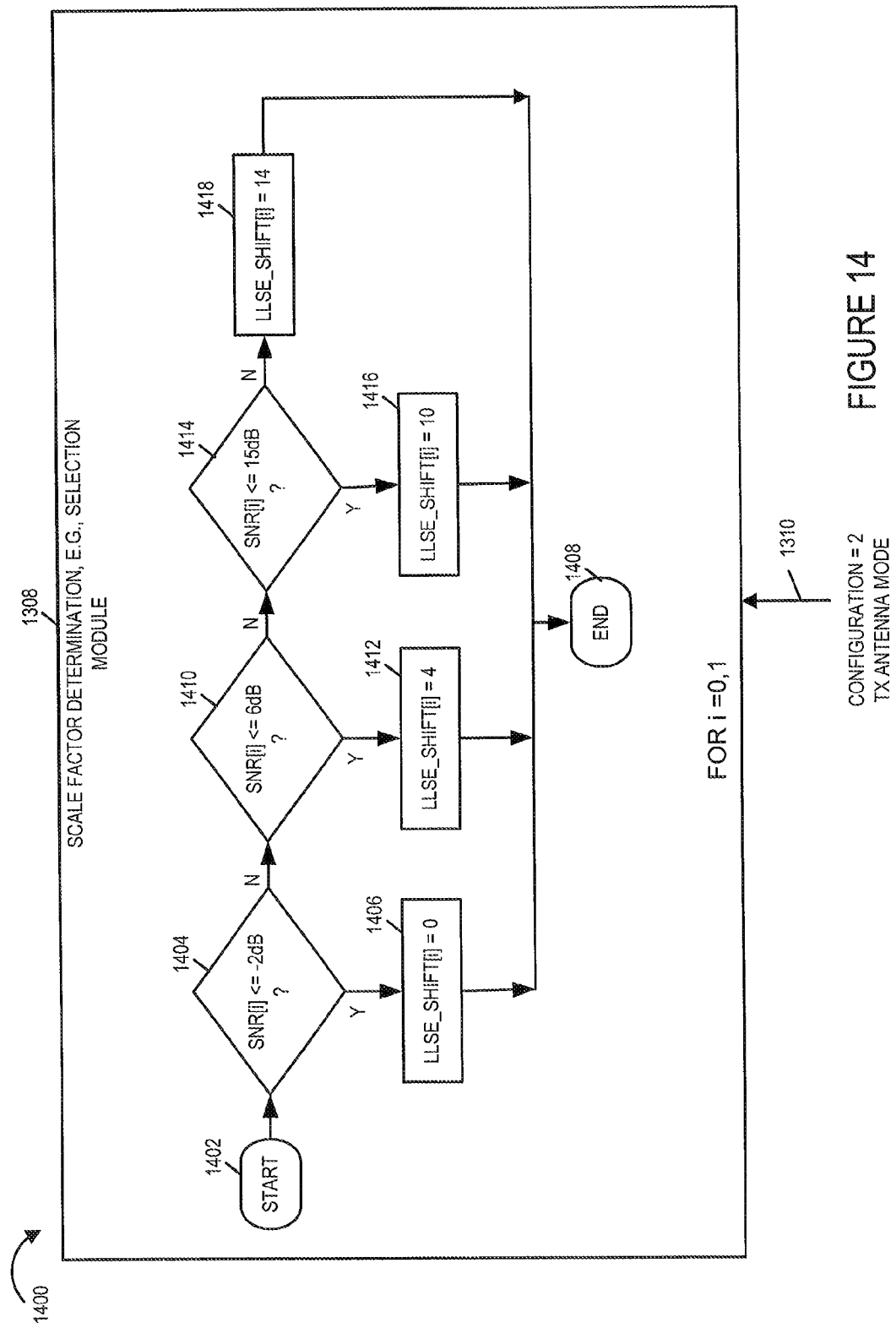
FIG. 14 is a drawing illustrating an exemplary implementation of a scale factor determination module for a two transmit antenna mode of operation, wherein a scaling factor determination is a selection of a scaling factor value from a first fixed size set of predetermined scaling factor values as a function of SNR.

FIG. 14 is a drawing 1400 illustrating an exemplary implementation of scale factor determination module 1308, e.g., selection module, for a two transmit antenna mode of operation as indicated by input 1310. In the two transmit antenna case, the module 1308 is used once for each antenna, e.g., twice in the two antenna case, to obtain one set of scale factor values. Thus, in some embodiments, module 1308 determines the scale factor to be used for antenna identified by index 0 and then the second antenna identified by index 1.

Index i=0 is used when processing $SNR_0$ 1304 to obtain scaling factor 0 1210, while index i=1 is used to process $SNR_1$ 1306 to obtain scaling factor 1 1212. In some embodiments, each module included in the scale factor determination module 1308 is implemented in hardware. However, software implementation and/or a combination of hardware and software may be used to implement the modules shown in FIG. 14. Start module 1402 corresponds to the start of processing with the module 1402 being responsible for initiating the determination process. Once the scale factor determination processes is started by module 1402, processing proceeds to a first SNR comparison module 1404 which performs an SNR[i] determination to determine which module should be used next. In the first SNR comparison module 1404 SNR[i] is tested against the value of −2 dBs. If SNR[i] is less than or equal to −2 dBs, then module 1404 determines that operation should proceed to module 1406 which is a first LLSE_SHIFT [i] set module. If operation proceeds to the first LLSE_SHIFT [i] setting module 1406, the scale factor LLSE_SHIFT[i] is set equal to 0. The scale factor LLSE_SHIFT[i] is then output by end module 1408, e.g., to LLSE estimation module 1202.

If the first SNR comparison module 1404 determines that SNR[i] is not less than or equal to −2 dBs, then operation proceeds from module 1404 to a second SNR comparison module 1410. The second SNR comparison module 1410 determines if SNR[i] is less than or equal to 6 dB, e.g., by comparing SNR[i] to a 6 dB threshold. If module 1410 determines that SNR[i] is less than or equal to 6 dB operation is directed to a second LLSE_SHIFT[i] setting module 1412, where the scale factor LLSE_SHIFT[i] is set equal to 4. The scale factor LLSE_SHIFT[i] is then output by end module 1408, e.g., to LLSE estimation module 1202.

If the second SNR comparison module 1410 determines that SNR[i] is not less than or equal to 6 dBs, then operation proceeds from the second SNR comparison module 1410 to a third SNR comparison module 1414. The third SNR comparison module 1414 determines if SNR[i] is less than or equal to 15 dB, e.g., by comparing SNR[i] to a 15 dB threshold. If module 1414 determines that SNR[i] is less than or equal to 15 dB operation is directed to a third LLSE_SHIFT[i] setting module 1416, where the scale factor LLSE_SHIFT[i] is set equal to 10. The scale factor LLSE_SHIFT[i] is then output by end module 1408, e.g., to LLSE estimation module 1202. However If module 1414 determines that SNR[i] is not less than or equal to 15 dB operation is directed to a fourth LLSE_SHIFT[i] setting module 1418, where the scale factor LLSE_SHIFT[i] is set equal to 14. The scale factor LLSE_SHIFT[i] is then output by end module 1408, e.g., to LLSE estimation module 1202.

By using the scale factor determination module 1308 for antennas identified by index i=0 and index i=1, LLSE_SHIFT [0] will be generated and output as scaling factor 0 1210, and LLSE_SHIFT[1] will be generated and output as scaling factor 1 1212.

Figure 15:
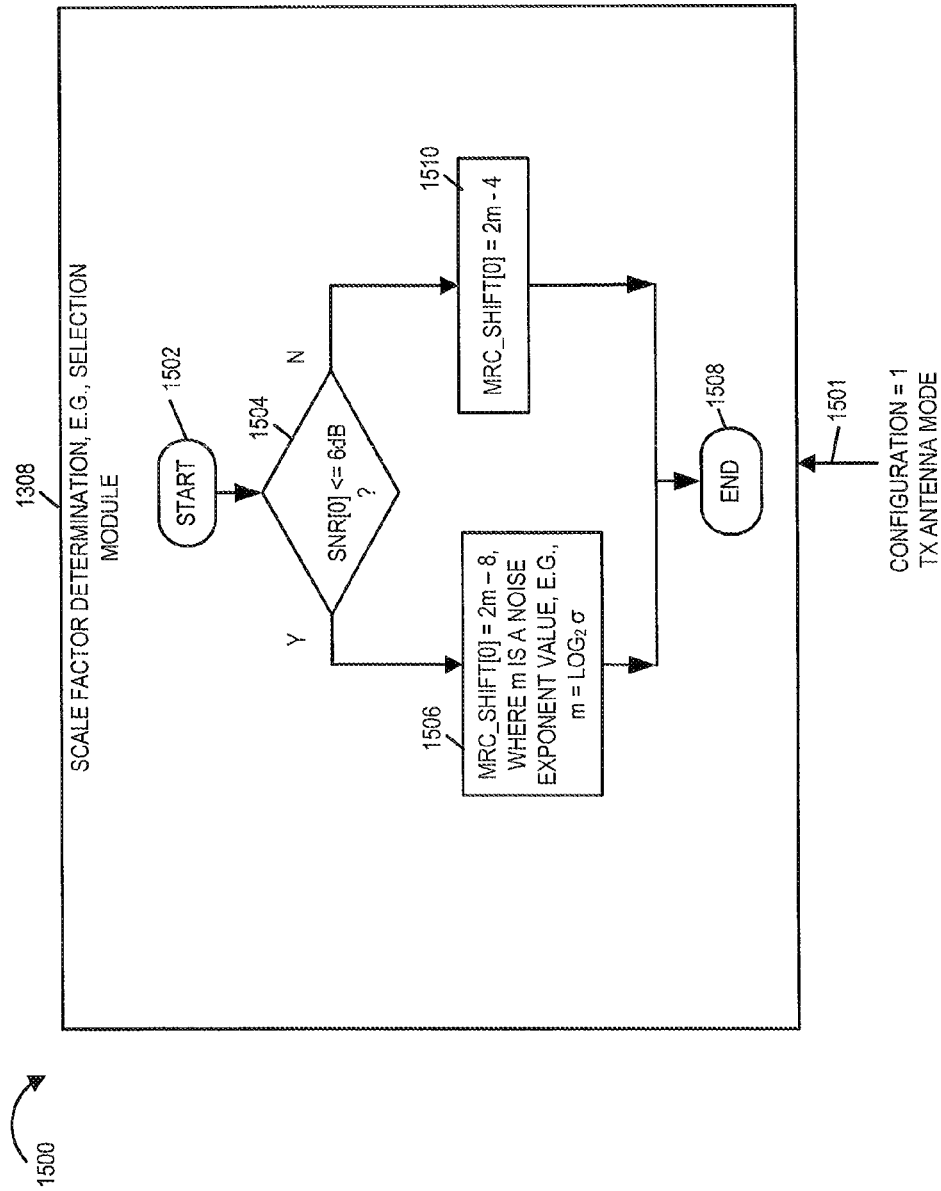
FIG. 15 is a drawing illustrating an exemplary implementation of scale factor determination module for a single transmit antenna mode of operation wherein a scaling factor determination is a selection of a scaling factor value from a second fixed size set of predetermined scaling factor values as a function of SNR.

FIG. 15 is a drawing 1500 illustrating an exemplary implementation of scale factor determination module 1308, e.g., selection module, for a single transmit antenna mode of operation as indicated by input 1501 which shows the transmit configuration being set to indicate a single transmit antenna mode of operation. The elements of module 1308 are used, in the single antenna case, to obtain a single individual scaling factor, scaling factor 0 as a function of $SNR_0$. Each module of the scale factor determination module 1308 may be implemented as a module in hardware, software and/or a combination of hardware and software. In start module 1502 operation is initiated with processing proceeding to SNR comparison module 1504. SNR comparison module 1504 determines if SNR[0] is less than or equal to 6 dB, e.g., by comparing SNR[0] to a 6 dB threshold.

If SNR comparison module 1504 determines that SNR[0] is less than or equal to 6 dB operation is directed to a first scale factor setting module 1506, where the scale factor MRC_ SHIFT[0] is set equal to 2m−8, where m is a noise exponent value, e.g., m=$\log_2\sigma$. MRC_SHIFT[0] is a maximum ratio combining shift value. The scale factor MRC_SHIFT[0] is then output by end module 1508, e.g., to an LLSE estimation module. In the single receive antenna case, in the FIG. 15 embodiment, the shift value is a maximum ratio combining (MRC) shift value.

If SNR comparison module 1504 determines that SNR[0] is not less than or equal to 6 dB operation is directed to a second scale factor setting module 1510, where the scale factor MRC_SHIFT[0] is set equal to 2m−4, where m is the noise exponent value, e.g., m=$\log_2\sigma$. The scale factor MRC_ SHIFT[0] is then output by end module 1508, e.g., to an LLSE estimation module.

The techniques of various embodiments may be implemented using software, hardware and/or a combination of software and hardware. Various embodiments are directed to apparatus, e.g., wireless communications devices including, e.g., access terminals such as wireless mobile nodes and wireless stationary nodes, and access points such as base stations. Some embodiments are directed to wireless communications systems. Various embodiments are also directed to methods, e.g., method of controlling and/or operating wireless communications devices including access terminals such as mobile nodes and stationary nodes, and access points such as base stations, and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. Various features are directed to novel messages and/or the use of novel messages. The messages are generated, stored and/or communicated. As part of the communications processes one or more of the messages are stored prior to transmission and stored upon receipt. Thus, some features are directed to a memory device, e.g., computer readable medium, having stored thereon one or more of the messages described in the present application. In many cases the messages provide efficiency in terms of their data structure and/or other benefits, over other message formats which might be used, such as the ability to easily identify and access some information in the message.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented. In various embodiments nodes described herein are implemented using one or more modules to perform the steps corresponding to one or more methods, for example, generating a first set of n scaling factors, one per transmit antenna, each of the n scaling factors being based on a noise estimate and an expected received signal power level corresponding to the one of the n transmit antennas to which the scaling factor corresponds; receiving a first set of n symbols transmitted from said n different antennas; performing a first linear least squares error estimation on said first set of n symbols, as a function of the generated first set of n scaling factors, to generate for each of the received symbols in the first set of n received symbols an estimated transmitted symbol value, etc. Thus, in some embodiments, various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention. In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method for operating a communications module to generate an estimate of one or more transmitted symbols, comprising:
generating a first set of n scaling factors, one per transmit antenna, each of the n scaling factors being based on a noise estimate and an expected received signal power level corresponding to the one of the n transmit antennas to which the scaling factor corresponds, wherein generating the first set of n scaling factors, one per n different antennas, includes selecting from a set of predetermined scaling factors a scaling factor to be used based on the pilot based noise estimate and the expected received signal power level corresponding to the one of the antennas to which the generated scaling factor corresponds;
receiving a first set of n symbols transmitted from said n different antennas; and
performing a first linear least squares error estimation on said first set of n symbols, as a function of the generated first set of n scaling factors, to generate for each of the received symbols in the first set of n received symbols an estimated transmitted symbol value, where n is a positive integer.

2. The method of claim 1, further comprising:
receiving the pilot based noise estimate as an input value;
receiving as input values, a set of n expected received signal power levels, one expected received signal power level per transmit antenna.

3. The method of claim 2, further comprising:
receiving a second set of n symbols transmitted from said n different antennas; and
performing a second linear least squares error estimation on said second set of n symbols, as a function of the generated first set of n scaling factors, to generate for each of the received symbols in the second set of n received symbols an estimated transmitted symbol value.

4. The method of claim 2, wherein number of predetermined scaling factors in said set of predetermined scaling factors is predetermined.

5. The method of claim 4, wherein said number of predetermined scaling factors is a function of at least one of the number of transmit antennas and the dynamic signal range to be supported.

6. The method of claim 5, further comprising:
configuring the communications module at a first point in time to process received signals transmitted from a first number of antennas during a first time period, said configuring including setting said communications module to select the scaling factors from a first set of predetermined scaling factors including a first number of predetermined scale factor values; and configuring the communications module at a second point in time to process received signals transmitted from a second number of antennas during a second time period, said configuring including setting said communications module to select the scaling factors from a second set of predetermined scaling factors including a second number of predetermined scale factor values which is different from said first number.

7. The method of claim 6, wherein when n is 2, the first number of predetermined scale factor values is 4 and when n is one, the second number of predetermined scale factor values is 2.

8. A communications module for use in a communications device, the communications module comprising:

means for generating a first set of n scaling factors, one per transmit antenna, each of the n scaling factors being based on a noise estimate and an expected received signal power level corresponding to the one of the n transmit antennas to which the scaling factor corresponds, wherein generating a first set of n scaling factors, one per n different antennas, includes selecting from a set of predetermined scaling factors a scaling factor to be used based on the pilot based noise estimate and the expected received signal power level corresponding to the one of the antennas to which the generated scaling factor corresponds;

means for receiving a first set of n symbols transmitted from said n different antennas; and means for performing a first linear least squares error estimation on said first set of n symbols, as a function of the generated first set of n scaling factors, to generate for each of the received symbols in the first set of n received symbols an estimated transmitted symbol value, where n is a positive integer.

9. The communications module of claim 8, further comprising:

means for receiving the pilot based noise estimate as an input value;

means for receiving as input values, a set of n expected received signal power levels, one expected received signal power level per transmit antenna.

10. The communications module of claim 9, further comprising:

means for receiving a second set of n symbols transmitted from said n different antennas; and means for performing a second linear least squares error estimation on said second set of n symbols, as a function of the generated first set of n scaling factors, to generate for each of the received symbols in the second set of n received symbols an estimated transmitted symbol value.

11. The communications module of claim 9, wherein number of predetermined scaling factors in said set of predetermined scaling factors is predetermined.

12. The communications module of claim 11, wherein said number of predetermined scaling factors is a function of at least one of the number of transmit antennas and the dynamic signal range to be supported.

13. A non-transitory computer program product for use in a communications device, the non-transitory computer program product comprising:

a non-transitory computer readable medium comprising:
code for causing at least one computer to generate a first set of n scaling factors, one per transmit antenna, each of the n scaling factors being based on a noise estimate and an expected received signal power level corresponding to the one of the n transmit antennas to which the scaling factor corresponds, wherein generating a first set of n scaling factors, one per n different antennas, includes selecting from a set of predetermined scaling factors a scaling factor to be used based on the pilot based noise estimate and the expected received signal power level corresponding to the one of the antennas to which the generated scaling factor corresponds;

code for causing said at least one computer to receive a first set of n symbols transmitted from said n different antennas; and code for causing said at least one computer to perform a first linear least squares error estimation on said first set of n symbols, as a function of the generated first set of n scaling factors, to generate for each of the received symbols in the first set of n received symbols an estimated transmitted symbol value, where n is a positive integer.

14. A communications device comprising:

a communications module including at least one processor configured to:

generate a first set of n scaling factors, one per transmit antenna, each of the n scaling factors being based on a noise estimate and an expected received signal power level corresponding to the one of the n transmit antennas to which the scaling factor corresponds, wherein said at least one processor is configured to select from a set of predetermined scaling factors a scaling factor to be used based on the pilot based noise estimate and the expected received signal power level corresponding to the one of the antennas to which the generated scaling factor corresponds, as part of being configured to generate a first set of n scaling factors, one per n different antennas;

receive a first set of n symbols transmitted from said n different antennas; and perform a first linear least squares error estimation on said first set of n symbols, as a function of the generated first set of n scaling factors, to generate for each of the received symbols in the first set of n received symbols an estimated transmitted symbol value, where n is a positive integer;

and memory coupled to said at least one processor.

15. The communications device of claim 14, wherein said at least one processor is further configured to:

receive the pilot based noise estimate as an input value;
receive as input values, a set of n expected received signal power levels, one expected received signal power level per transmit antenna.

16. The communications device of claim 15, wherein said at least one processor is further configured to:

receive a second set of n symbols transmitted from said n different antennas; and perform a second linear least squares error estimation on said second set of n symbols, as a function of the generated first set of n scaling factors, to generate for each of the received symbols in the second set of n received symbols an estimated transmitted symbol value.

17. The communications device of claim 15, wherein number of predetermined scaling factors in said set of predetermined scaling factors is predetermined.

* * * * *